(12) United States Patent
Sakakibara

(10) Patent No.: US 9,030,472 B2
(45) Date of Patent: May 12, 2015

(54) MAP DISPLAY MANIPULATION APPARATUS

(71) Applicant: DENSO CORPORATION, Aichi-Pref (JP)

(72) Inventor: Hiroaki Sakakibara, Nisshin (JP)

(73) Assignee: DENSO CORPORATION, Kariya (JP)

( * ) Notice: Subject to any disclaimer, the term of this patent is extended or adjusted under 35 U.S.C. 154(b) by 362 days.

(21) Appl. No.: 13/684,669

(22) Filed: Nov. 26, 2012

(65) Prior Publication Data

US 2013/0141429 A1    Jun. 6, 2013

(30) Foreign Application Priority Data

Dec. 1, 2011    (JP) .................................. 2011-263560

(51) Int. Cl.
| | | |
|---|---|---|
| G06F 3/0346 | (2013.01) | |
| G06T 15/00 | (2011.01) | |
| G06F 1/16 | (2006.01) | |
| G06F 3/038 | (2013.01) | |
| G06F 3/0485 | (2013.01) | |
| G01C 21/36 | (2006.01) | |
| G09B 29/00 | (2006.01) | |
| G09B 29/10 | (2006.01) | |

(52) U.S. Cl.
CPC .............. *G06T 15/00* (2013.01); *G06F 1/1694* (2013.01); *G06F 3/038* (2013.01); *G06F 3/0485* (2013.01); *G06F 2203/0384* (2013.01); *G06F 2203/04806* (2013.01); *G06F 3/0346* (2013.01); *G01C 21/367* (2013.01); *G09B 29/005* (2013.01); *G09B 29/10* (2013.01)

(58) Field of Classification Search
CPC ............ G06F 220/1637; G06F 3/0346; G06F 2203/04806; G06F 1/1694
See application file for complete search history.

(56) References Cited

U.S. PATENT DOCUMENTS

| | | | |
|---|---|---|---|
| 5,554,980 A | | 9/1996 | Hashimoto et al. |
| 7,696,980 B1 * | | 4/2010 | Piot et al. ....................... 345/157 |
| 2001/0048423 A1 * | | 12/2001 | Rekimoto ..................... 345/157 |
| 2002/0032520 A1 * | | 3/2002 | Katayama et al. ............ 701/208 |
| 2005/0212911 A1 * | | 9/2005 | Marvit et al. .................. 348/154 |

(Continued)

FOREIGN PATENT DOCUMENTS

JP    A-2011-75893    4/2011

OTHER PUBLICATIONS

Office Action dated Aug. 18, 2014 issued in corresponding CN patent application No. 201210595701.5 (and English translation).

*Primary Examiner* — Kee M Tung
*Assistant Examiner* — Ryan M Gray
(74) *Attorney, Agent, or Firm* — Posz Law Group, PLC

(57) ABSTRACT

A navigation apparatus has a display portion displaying a map that is controlled by a remote control as a manipulator. The remote control has a gravitation sensor. The gravitation sensor serves as a position detector to detect a three-dimensional coordinate set (x, y, z) of the remote control. A reduced scale for the displayed map is changed based on a displacement in z axis while the displayed map is moved based on a horizontal displacement in xy-coordinate plane. The remote control may move obliquely in a direction being neither parallel with z axis nor orthogonal to z axis, drawing a U-shaped locus. In this case, the reduced scale is designated as a subject reduced scale based on the lowest coordinate in z axis; the displayed map is moved based on a product obtained by multiplying the horizontal displacement by a unit distance according to the subject reduced scale.

20 Claims, 15 Drawing Sheets

(56) References Cited

U.S. PATENT DOCUMENTS

| | | | |
|---|---|---|---|
| 2006/0242434 A1* | 10/2006 | Lee | 713/300 |
| 2007/0226646 A1 | 9/2007 | Nagiyama et al. | |
| 2007/0259689 A1 | 11/2007 | Kutaragi | |
| 2010/0088061 A1* | 4/2010 | Horodezky et al. | 702/141 |
| 2010/0110051 A1* | 5/2010 | Ming-Far et al. | 345/207 |
| 2010/0125816 A1* | 5/2010 | Bezos | 715/863 |
| 2010/0188503 A1* | 7/2010 | Tsai et al. | 348/142 |
| 2010/0194784 A1* | 8/2010 | Hoff et al. | 345/661 |
| 2011/0102455 A1* | 5/2011 | Temple | 345/619 |
| 2011/0298824 A1* | 12/2011 | Lee et al. | 345/633 |
| 2012/0038546 A1* | 2/2012 | Cromer et al. | 345/156 |
| 2012/0038675 A1* | 2/2012 | Johnson et al. | 345/660 |
| 2012/0182288 A1* | 7/2012 | Williams et al. | 345/419 |
| 2012/0206350 A1* | 8/2012 | Figaro et al. | 345/158 |
| 2012/0310588 A1* | 12/2012 | Lee et al. | 702/141 |

* cited by examiner

| LEVEL | MX | MY |
|---|---|---|
| 1 | 500m | 500m |
| 2 | 600m | 600m |
| ⋮ | ⋮ | ⋮ |
| n-4 | 1850m | 1850m |
| n-3 | 1900m | 1900m |
| n-2 | 1950m | 1950m |
| n-1 | 1980m | 1980m |
| n | 2000m | 2000m |

| POI | WEIGHT (W0) | TIMES (C) | ELAPSED MONTHS (T) | TOTAL (W) |
|---|---|---|---|---|
| CASTLE A | 100 | 0 | 0 | 100 |
| CITY HALL A | 70 | 0 | 0 | 70 |
| MUSEUM A | 30 | 0 | 0 | 30 |
| BANK A | 5 | 10 | 1 | 10 |
| ... | | | | |
| ⋮ | ⋮ | ⋮ | ⋮ | ⋮ |
| AIRPORT H | 100 | 0 | 0 | 100 |
| CITY HALL H | 40 | 10 | 1 | 80 |
| STATION H | 10 | 0 | 0 | 10 |
| ⋮ | ⋮ | ⋮ | ⋮ | ⋮ |

REACH SPOT 3
NOT REACH SPOT 1
SPOT 3 IS BETWEEN "START" AND SPOT 1

REACH SPOT 3
NOT REACH SPOT 1
SPOT 3 IS BETWEEN "START" AND SPOT 1

MAP DISPLAY MANIPULATION APPARATUS

CROSS REFERENCE TO RELATED APPLICATION

The present application is based on Japanese Patent Application No. 2011-263560 filed on Dec. 1, 2011, the disclosure of which is incorporated herein by reference.

TECHNICAL FIELD

The present disclosure relates to a map display manipulation apparatus for manipulating a movement of a map displayed on a display portion and a change of a reduced scale of the map.

BACKGROUND

[Patent document 1] JP 2011-075893 A

A navigation apparatus displays a map on a display portion. The map displayed may need to switch from one region to another region; the on-map position displayed may need to switch from a present position to a goal position. To respond to those needs, the manipulation is made for the movement of the map and the change of the reduced scale of the map. For example, when a touch manipulation to a screen of the display portion permits the movement of the map displayed on the screen, a touch is made onto an on-screen position located in an intended direction from the center of the screen, thereby scrolling the map to the intended direction. In addition, when the enlargement or reduction of the map displayed is made by the change of the reduced scale, a press manipulation is made onto an enlargement button or a reduction button.

In addition, the touch manipulation onto the screen includes a flick manipulation and pinch manipulation using fingers to move the display according to the movement of the finger or to enlarge or reduce the display according to the mutual movements of the two fingers. In the pinch manipulation, the display actually appearing is enlarged or reduced with the touch manipulation of enlarging or reducing the gap between two fingers, providing a user-friendly tactile sense. However, the direct touch manipulation onto the screen is not so easy for a navigation apparatus mounted in a vehicle.

A remote manipulation using a remote control may also be used for moving a display and changing a reduced scale of the display, as described in Patent document 1. Tracing a manipulation guide region G on the remote control permits scrolling of the map displayed and changing of the reduced scale simultaneously.

However, Patent document 1 does not explicitly describe specific setups of the reduced scale. For instance, suppose that a present place displayed needs to be changed to another place away from the present place by about 1,000 km, requiring a great number of changes in the reduced scale. Such changes may require a troublesome manipulation for a user, precluding an intuitive manipulation and not providing an effective usability.

SUMMARY

It is an object of the present disclosure to provide a map display manipulation apparatus that has a sufficient usability.

To achieve the above object, according to a first example of the present disclosure, a map display manipulation apparatus is provided as follows. The map display manipulation apparatus includes a display portion, a manipulator, a position detector, and a control circuit. The display portion performs a map display to display a map based on map information. The manipulator performs a manipulation to the map display. The manipulator may be displaced in a three-dimensional coordinate system of x axis, y axis, and z axis, the x, y, and z axes being mutually orthogonal. The manipulator displaced parallel with the x axis and the y axis permits the map to move laterally and longitudinally, respectively. The manipulator displaced parallel with the z axis permits a reduced scale of the map to change such that as a z coordinate becomes lower, the reduced scale decreases to permit a displayed map in the display portion to cover a wider area. The position detector detects and outputs a coordinate set as a position of the manipulator in the three-dimensional coordinate system at each of successive detecting times during a detection duration from an initial detecting time via middle detecting times to a present detecting time.

The control circuit controls the map display in the display portion on a basis of a real time in response to receiving each of the coordinate sets of the manipulator during the detection duration. The control circuit performs an initial operation to display the map under an initial reduced scale with an initial map-center position centered in the display portion when receiving an initial coordinate set at the initial detecting time.

The control circuit performs a present-time operation when receiving a present coordinate set at the present detecting time after receiving middle coordinate sets at the middle detecting times from the position detector. The present-time operation takes place as follows: (i) determining whether only an oblique locus is drawn by determining whether any portion of a locus of the manipulator drawn during the detection duration from the initial detecting time via the middle detecting times to the present detecting time corresponds to an oblique locus that is neither parallel with the z axis nor orthogonal to the z axis, and (ii) processing a present-time map display when it is determined that only the oblique locus is drawn. The present-time map display takes place as follows: (i) calculating a cumulative displacement between the present coordinate set and the initial coordinate set, the cumulative displacement having a cumulative x displacement, a cumulative y displacement, and a cumulative z displacement, (ii) calculating a lowest z coordinate among the initial z coordinate, the middle z coordinates, and the present z coordinate, and (iii) displaying the map under a present reduced scale based on the present z coordinate with a new map-center position centered in the display portion, the new map-center position being away from the initial map-center position laterally by a first product and longitudinally by a second product. Herein, the first product is obtained by multiplying the cumulative x displacement by a first unit distance according to a reduced scale based on the lowest z coordinate; the second product is obtained by multiplying the cumulative y displacement by a second unit distance according to the reduced scale based on the lowest z coordinate.

Such a configuration can provide a convenient manipulation for moving, enlarging, or reducing a displayed map in a display portion only using a manipulator, which may be held by a user, without any direct touch to the display portion, providing a user-friendly manipulation.

Suppose that the manipulator is displaced to draw a U-shaped locus without any partial displacement parallel with the z axis or orthogonal to the z axis from a start position to a goal position via a first bottom of the U-shaped locus having the lowest coordinate, changing an initial displayed map of a first region to an intended displayed map of a second region. In such a case, under the configuration of the above example of the present disclosure, as long as any different U-shaped or V-shaped locus of the manipulator is drawn from the same start position to the same goal position while having the same lowest coordinate without any partial displacement parallel with the z axis or orthogonal to the z axis, the displayed map is changed from the initial displayed map to the intended displayed map, equivalently. In addition, the equivalent map movement may be made by a rectangle displacement by displacing the manipulator along the z axis from the start position to the lowest coordinate, then displacing the manipulator orthogonally to the z axis to the position having the lowest coordinate and the same x, y coordinates of the goal position, and finally displacing the manipulator along the z axis to the goal position. However, such a rectangle displacement of the manipulator is a troublesome for a user; thus, the above configuration of the first example of the present disclosure can provide a user-friendly manipulation of the manipulator.

Further, according to a second example of the present disclosure, a map display manipulation apparatus may be provided to include the display portion, the manipulator, the position detector, and the control circuit, similar to the first example. Herein, the position detector detects and outputs a coordinate set as a position of the manipulator in the three-dimensional coordinate system at each of successive detecting times from an initial detecting time to subsequent detecting times. The control circuit controls the map display in the display portion on a basis of a real time in response to receiving the coordinate set of the manipulator at each of the successive detecting times.

The control circuit performs an initial operation when receiving an initial coordinate set at the initial detecting time from the position detector. The initial operation takes place as follows: (i) assigning a reference coordinate set of the manipulator with a value of the initial coordinate set, (ii) assigning a reference lowest z coordinate with a value of the initial z coordinate, (iii) displaying the map under an initial reduced scale with an initial map-center position centered in the display portion, and (iv) assigning a reference map-center position with a value of the initial map-center position.

The control circuit performs a subsequent operation when receiving a subsequent coordinate set at a subsequent detecting time after the initial detecting time from the position detector. The subsequent operation takes place as follows: (i) calculating a one-time displacement between the subsequent coordinate set and a previous coordinate set, which is outputted from the position detector at a previous detecting time that is just previous to the subsequent detecting time, the one-time displacement having a one-time x displacement, a one-time y displacement, and a one-time z displacement, (ii) calculating a cumulative displacement between the subsequent coordinate set and a present value of the reference coordinate set, the cumulative displacement having a cumulative x displacement, a cumulative y displacement, and a cumulative z displacement, and (iii) determining whether the one-time displacement corresponds to a z-oblique displacement, z-orthogonal displacement, or a z-parallel displacement. The z-oblique displacement is neither parallel with the z axis nor orthogonal to the z axis. The z-orthogonal displacement is orthogonal to the z axis. The z-parallel displacement is parallel with the z axis.

When it is determined that the one-time displacement corresponds to the z-oblique displacement, the subsequent operation then further takes place as follows: (i) comparing a present value of the reference lowest z coordinate with a subsequent value of the subsequent z coordinate and assigning the reference lowest z coordinate with a lower value of the present value and the subsequent value, (ii) displaying the map under a subsequent reduced scale based on the subsequent z coordinate with a first new map-center position centered in the display portion, the first new map-center position being away from the reference map-center position laterally by a first product and longitudinally by a second product, the first product being obtained by multiplying the cumulative x displacement by a first unit distance according to a lowest reduced scale based on the reference lowest z coordinate, the second product being obtained by multiplying the cumulative y displacement by a second unit distance according to the lowest reduced scale based on the reference lowest z coordinate, (iii) maintaining unchanged a present value of the reference map-center position, and (iv) maintaining unchanged a present value of the reference coordinate set.

Such a featured configuration described above can provide an advantage similar to that of the first example.

Yet further, according to a third example of the present disclosure, a method is provided for controlling the map display manipulation apparatus according to the second example.

BRIEF DESCRIPTION OF THE DRAWINGS

The above and other objects, features, and advantages of the present disclosure will become more apparent from the following detailed description made with reference to the accompanying drawings. In the drawings.

DETAILED DESCRIPTION

A vehicular navigation apparatus according to an embodiment of the present disclosure will be explained with reference to drawings.

Figure 1:
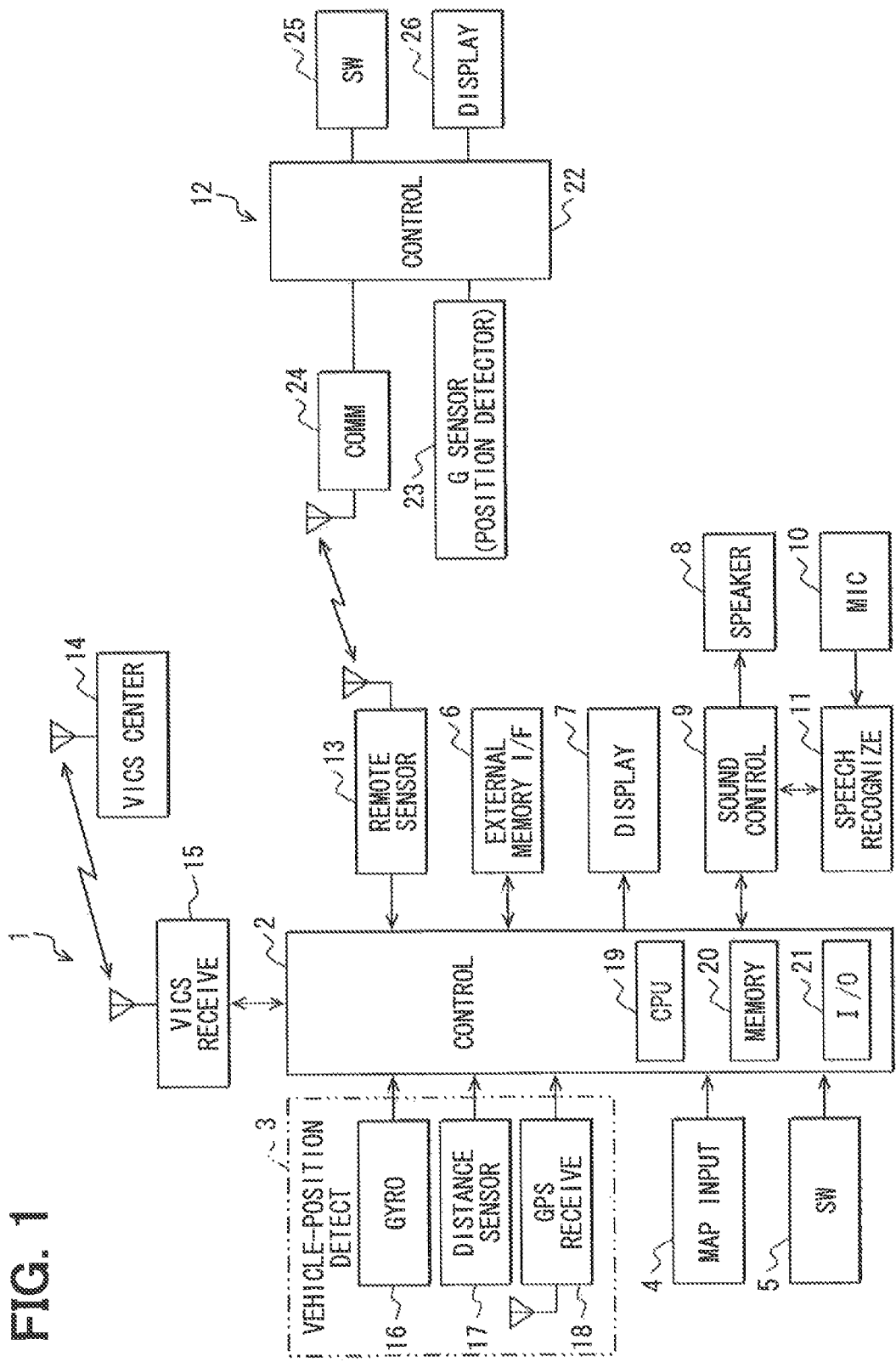
FIG. 1 is a block diagram according to an embodiment of the present disclosure.

With reference to FIG. 1, the vehicular navigation apparatus 1 that is mounted in a subject vehicle includes a control circuit 2 mainly composed of a microcomputer serving as a control device or means. The control circuit 2 includes the following: a vehicle-position detector 3; a map data input portion 4; a manipulation switch group 5; an external memory interface 6; a display portion 7; a sound controller 9 connected with a speaker 8; a speech recognition portion 11 to recognize sounds inputted to a microphone 10; a remote control sensor 13 to communicate commands with a remote control 12; and a VICS (Vehicle Information and Communication System, registered trademark) receiver 15 to receive VICS information distributed from a VICS center 14.

The vehicle-position detector 3 that detects a present position of the subject vehicle includes the following sensors: a gyroscope 16 to detect an angular velocity of a rotation of the subject vehicle; a distance sensor 17 to detect a travel distance of the subject vehicle; and a GPS (Global Positioning System) receiver 18 to detect a present position of the subject vehicle based on transmission electric waves from GPS satellites. The control circuit 2 detects a present position, a heading direction, a speed, and a travel distance of the subject vehicle, and a present clock time based on detection signals of the sensors 16 to 18. If more highly accurate sensors are adopted, only part of the sensors 16 to 18 of the vehicle-position detector 3 may be necessary. Alternatively, another sensor such as a revolution sensor for the steering or a vehicle wheel sensor for following wheels may be used.

The map data input portion 4 is composed of a drive portion to read data such as map data from a data recording medium. Such a data recording medium may generally be a mass storage medium such as DVD; alternatively, it may be another storage medium such as a CD, memory card, or hard disk drive, In addition, the data recording medium stores various data necessary for various processes such as a route retrieval and a route guidance, and databases such as a facility name database where facility names are arranged in a predetermined character order such as an alphabetical order, Japanese 50 character order, and a phone number database which indicate correspondence between phone numbers and facilities.

The display portion 7 serving as a display device or means includes a color liquid crystal display portion so as to display map information. The display portion 7 is integrated with a touch panel for manipulation input. The touch panel is composed of transparent electrodes that are disposed on a surface of the color liquid crystal display portion. The display portion 7 displays a map on a map window displayed on a screen with a predetermined reduced scale along with various kinds of guidance information. The map includes a present position of the vehicle, a destination, or a spot that is requested to highlight. In addition, a touch manipulation applied to a portion currently displayed on the screen of the display portion 7 allows an input in response to (i) a position of the portion and (ii) manipulation specifics associated with the portion.

The manipulation switch group 5 is composed of a plurality of switches that include mechanical hardware switches provided near the screen of the display portion 7 and software switches provided on the touch panel in the screen of the display portion 7. The manipulation switch group 5 gives the control circuit 2 various instruction signals (commands) in response to manipulations to the mechanical switches and touch panel switches.

The speech recognition portion 11 verifies sounds inputted via the microphone 10 with recognition-use dictionary data internally stored, recognizing the sounds inputted. The sound controller 9 controls the speech recognition portion 11 to output speech recognition results to the control circuit 2, while outputting talk-backs of recognized sounds via the speaker 8. In addition, the sound controller 9 outputs sound output signals based on sound output instructions from the control circuit 2 to the speaker 8. Sounds outputted from the speaker 8 include sounds about route guidance, sounds about manipulation explanations, and sounds of the talk-backs.

The control circuit 2 includes an input/output interface 21, a CPU 19, and a memory 20 containing a RAM, a ROM, an EEPROM, and a flash memory; it has a function to control overall navigation operations. The control circuit 2 performs processes such as route retrieval and route guidance by permitting the CPU 19 to execute control programs stored in the memory 20.

The remote control 12 serving as a manipulator, manipulation device, or manipulation means may include a so-called smart phone and be provided with a device or means to detect positions. In the present embodiment, the smart phone may be used as the remote control 12 for map manipulation in the vehicular navigation apparatus 1. In this case, the remote control 12 is composed of a control circuit 22 with a CPU to control the map manipulation. The control circuit 22 serving as a control device or means is connected with a gravitation (G) sensor (i.e., acceleration sensor) 23, a communication circuit 24, a switch group 25, and a display portion 26.

The G sensor 23 may be referred to as a position detector of the remote control 12 (i.e., the manipulator), The G sensor 23 detects three-dimensional movements, which indicate manipulation specifics by a user, as acceleration detection signals. The control circuit 22 calculates three-dimensional coordinate sets and displacements of the remote control 12 based on the acceleration detection signals. The communication circuit 24 communicates with the remote control sensor 13 of the navigation apparatus 1; it transmits manipulation specifics outputted from the control circuit 22 to the navigation apparatus 1 and receives various information from the navigation apparatus 1.

Figure 2:
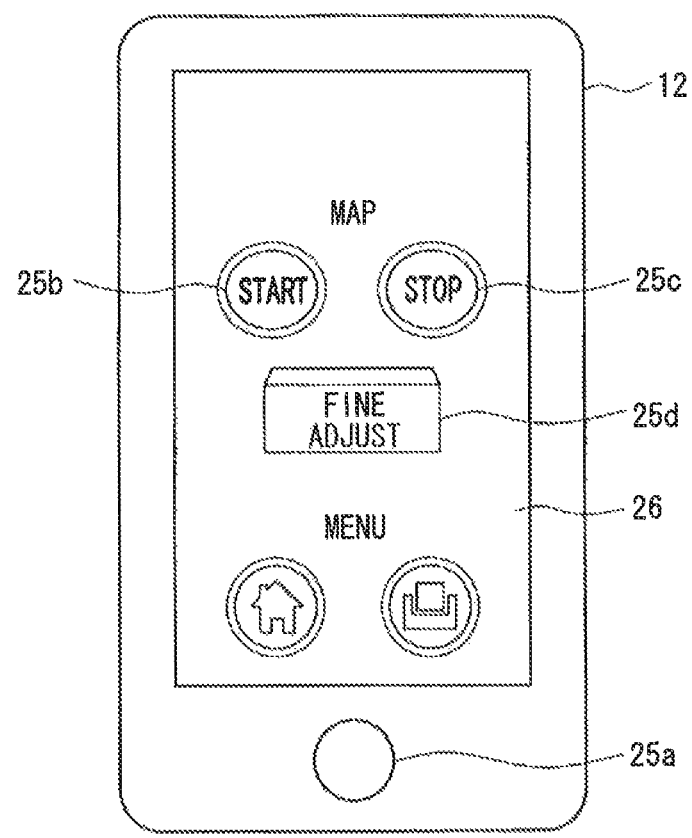
FIG. 2 is a top view illustrating an external appearance of a remote control.

With reference to FIG. 2, the display portion 26 serving as a screen is composed of a color liquid crystal display portion provided almost over a front face of a main body of the remote control 12 for displaying various windows for manipulations and other necessary information. The display portion 26 is provided with a touch panel on a surface, displaying manipulation buttons on a window to function as a switch group 25. In addition, a power switch 25a is provided under the display portion 26 as one switch of the switch group 25. This power switch 25a functions as (i) a switch for turning on and off of a power supply source and (ii) a switch for returning to a home window for serving as a smart phone.

FIG. 2 illustrates a window on the display portion 26 to provide a state to enable manipulations of an application for map manipulation. The touch manipulation applied to START switch 25b and STOP switch 25c performs, respectively, a start and a stop of the map manipulation with the application for map manipulation. A fine adjustment button

25d is used to perform a fine adjustment by reducing a magnitude of a movement or displacement on a map with respect to a magnitude of a displacement of the remote control 12. In addition, the remote control 12 may be loaded or installed with an application to respond to manipulations for the navigation apparatus 1.

The following will explain operations for manipulating movements and reduced scale of a map that is displayed on the display portion 7 of the navigation apparatus 1 with reference to FIGS. 3 to 17. The processes of a route guidance and a map display in the route guidance, a destination designation, or a retrieval in the navigation apparatus 1 are known technologies; thus, the explanation thereof will be omitted.

The present embodiment permits the manipulation of map display with the remote control 12 to simulate an actual manipulation made when seeing a map on a paper, improving a manipulation feeling. According to one optional example, a person sees an on-paper map that is defined as a map printed on a paper such that the on-paper map is moved closer to the face of the person when intending to see a detailed smaller or narrower area of the on-paper map whereas the on-paper map is moved more distant away from the face when seeing a wider area of the on-paper map. While considering such a movement of the on-paper map or person, if the axis for changing the reduced scale of the map is defined as being orthogonal to the screen of the display portion 7 of the navigation apparatus 1, the remote control 12 for manipulating the navigation apparatus 1 may be moved vertically and/or horizontally to change the display state of an on-screen map that is a map on a screen as if the on-paper map is moved. This allows a display manipulation of the on-screen map to simulate a manipulation of the on-paper map. Hereinafter, the on-screen map may be also referred to as the "map" alone or "map displayed."

In the following explanation, the axis for changing the reduced scale of the map is defined as a vertical direction in which gravity acts. That is, when the remote control 12 being a smart phone is raised or moved upward, the reduced scale of the map displayed increases to enlarge a central area of the displayed map for a detailed display, covering or displaying a narrower area. When the remote control 12 is lowered or moved downward, the reduced scale of the map displayed decreases to cover a wider area. In addition, when the remote control 12 is moved horizontally or in a left-and-right direction, the map displayed is moved on the window in the screen.

The following will explain a relationship between manipulation specifics of the remote control 12 and map display specifics of the display portion 7. The position of the remote control 12 is represented by a three-dimensional coordinate system (x, y, z). The z axis is parallel with a gravity direction while a positive direction of the z axis corresponds to a direction opposite a direction in which gravity acts. The xy-coordinate plane is parallel with a horizontal plane while the x axis corresponds a lateral direction and the y axis corresponds to a longitudinal direction. The position represented by the three-dimensional coordinate system may be recognized by the G sensor 23. Therefore, in the following explanation, the movement of the remote control 12 in z axis corresponds to a displacement of the remote control 12 of the vertical direction or up-and-down direction; the movement of the remote control 12 of the x axis or y axis corresponds to a displacement of the remote control 12 of the lateral direction or the longitudinal direction on the horizontal plane (i.e., xy-coordinate plane).

The actual movable distance (RX, RY, RZ) of the remote control 12 is a fixed distance (40 cm, 40 cm, 20 cm), regardless of reduced scales of a map displayed. The actual movable distance of the remote control 12 may be also referred to as a manipulator movement span. The displacement $\Delta R$ of the remote control 12 is divided into the vertical displacement $\Delta z$ (0 to RZ) as a component in the z axis, the lateral displacement $\Delta x$ (0 to RX) as a component in the x axis, and the longitudinal displacement $\Delta y$ (0 to RY) as a component in the y axis. The lateral displacement $\Delta x$ (0 to RX) and the longitudinal displacement $\Delta y$ (0 to RY) are included in the horizontal displacement (on the X-Y plane (i.e., xy-coordinate plane)). The map displayed is moved based on a movement distance depending on (i) a product of multiplying the lateral displacement $\Delta x$ by a unit distance according to a reduced scale presently designated and (ii) a product of multiplying the longitudinal displacement $\Delta y$ by the unit distance according to the reduced scale presently designated.

Figure 9:
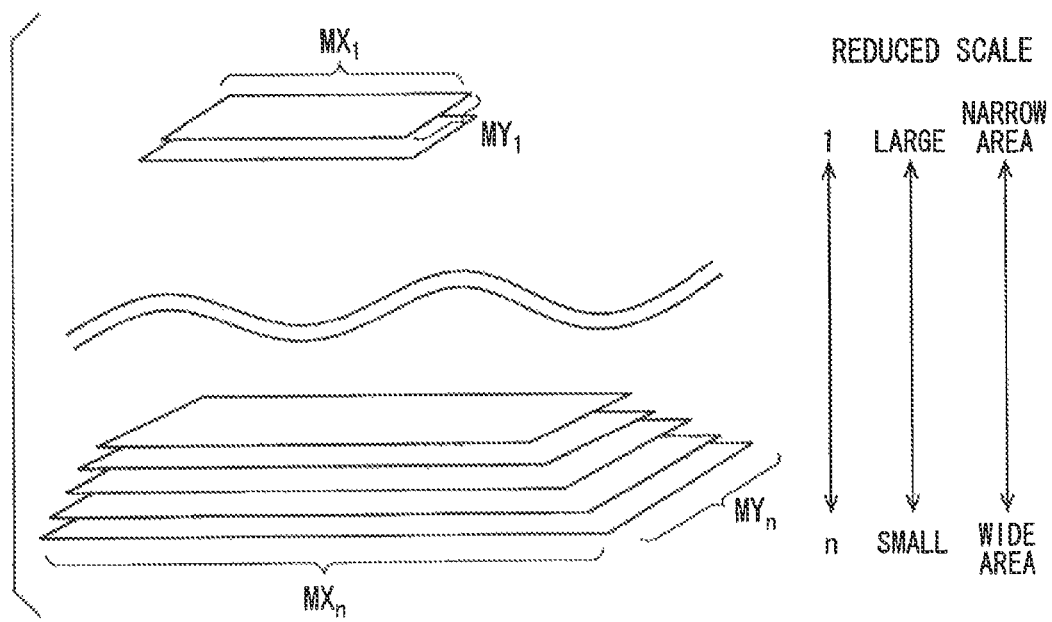
FIG. 9 is a diagram for explaining a relationship between reduced scales and movement spans.

It is noted that the reduced scale is defined as follows. For instance, when an on-screen length, which is a length on the screen of the display portion 7, between A point and B point on a map displayed is 1 cm and a real distance between A point and B point is 1 km (1000 m) on the earth, a reduced scale of the map is 1 cm/1 km (=0.01/1000=1/100,000). Thus, the reduced scale is typically less than one (1.0). Under the present embodiment, the reduced scale may be designated or selected among levels from level 1 to level n. The level 1 corresponds to a map covering a narrowest area with a reduced scale of a largest value; the level n corresponds to a map covering a widest area with a reduced scale of a smallest value. Further, with respect to a reduced scale of level k (=1, 2, . . . , n), an x-directional map movement span MXk is defined as an on-map distance moved by a maximum movement span of the remote control 12 in the x axis whereas a y-directional map movement span MYk is defined as an on-map distance moved by a maximum movement span of the remote control 12 in the y axis. The on-map distance is defined as a real distance covered by a map. Such a relationship is illustrated in FIG. 9.

Figures 10, 11:
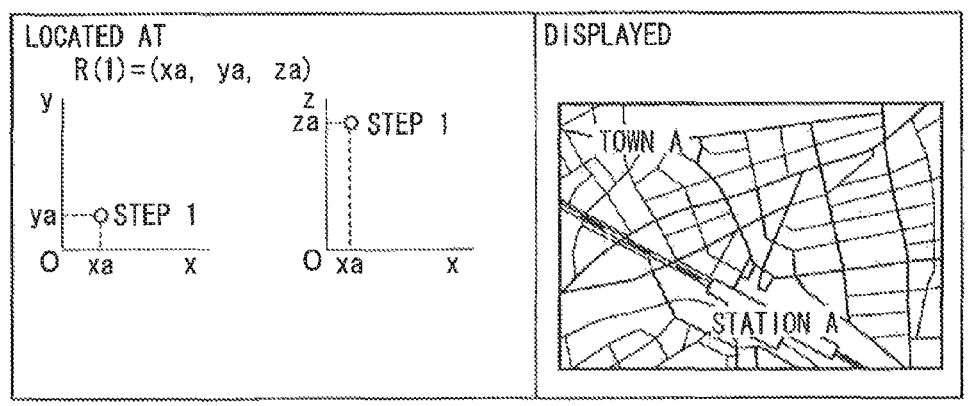
FIG. 10 is a diagram for explaining a relationship between reduced scales and movement spans.
FIG. 11 is a diagram illustrating a coordinate set as a position of the remote control and a display window (Step 1)

With reference to FIG. 10, a relationship between (i) the levels (1 to n) of the reduced scale and (ii) map movement spans MXn, MYn in x axis and y axis. For example, the largest-scale level 1 provides each of the map movement spans MX1, MY1 as 500 m. The level 2 provides each of the map movement spans MX2, MY2 as 600 m. The smallest-scale level n provides each of the map movement spans MXn, MYn as 2000 m (2 km). That is, as the level increases, the span increases step by step. The setup of the map movement spans MXk, MYk at a reduced scale of level k may be changed suitably, whereas the number of levels may also be changed without need to be limited to n levels.

Specifically, moving or displacing the remote control 12 on the horizontal plane by the manipulator movement span RX, RY (=40 cm) at a reduced scale of the level k results in moving the map based on the map movement span MXk, MYk, respectively. In contrast, moving or displacing the remote control 12 in the vertical direction by the manipulator movement span RZ (=20 cm) results in changing the reduced scale from the level 1 to the level n in maximum.

Figure 13:
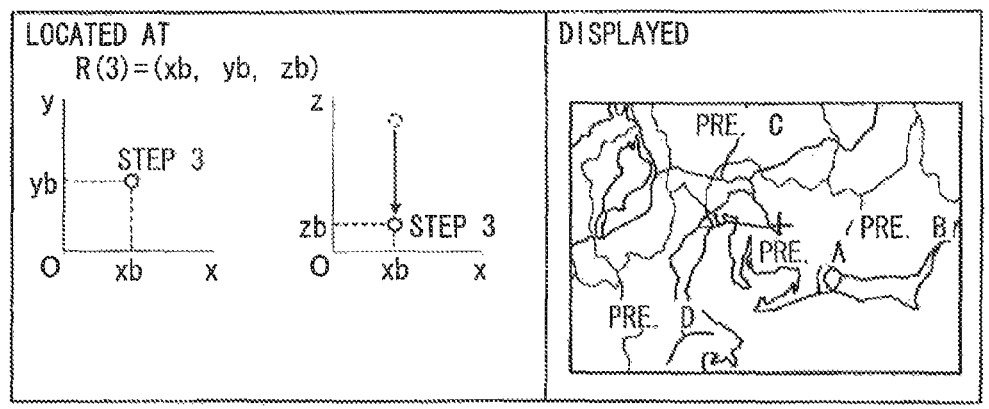
FIG. 13 is a diagram illustrating a coordinate set as a position of the remote control and a display window (Step 3)
Figure 14:
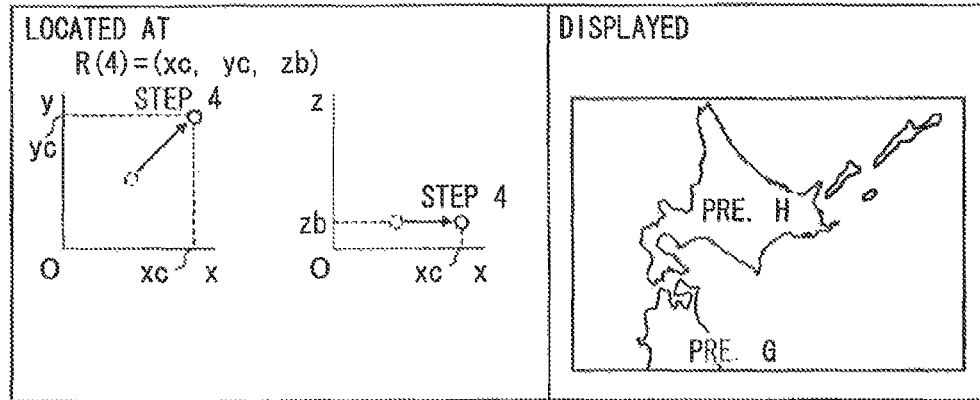
FIG. 14 is a diagram illustrating a coordinate set as a position of the remote control and a display window (Step 4)
Figures 15, 16:
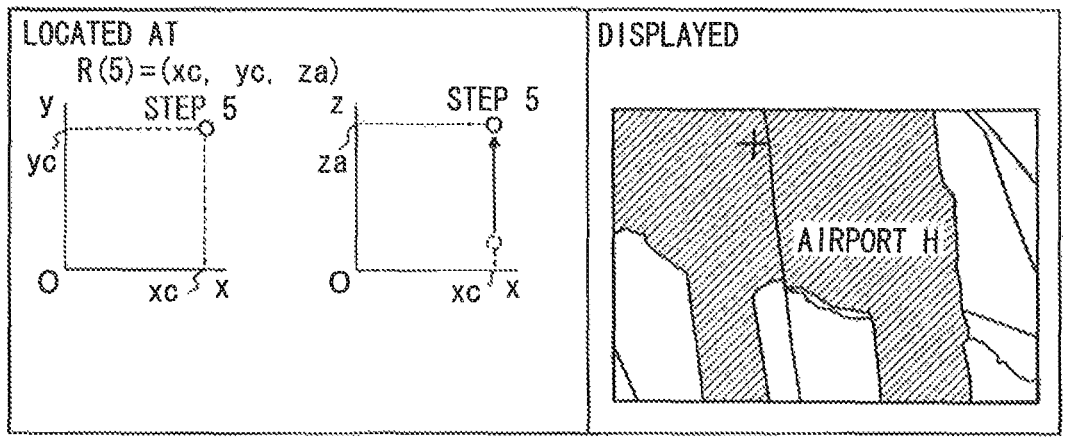
FIG. 15 is a diagram illustrating a coordinate set as a position of the remote control and a display window (Step 5)
FIG. 16 is a diagram for explaining weighting of POIs.
Figure 17:
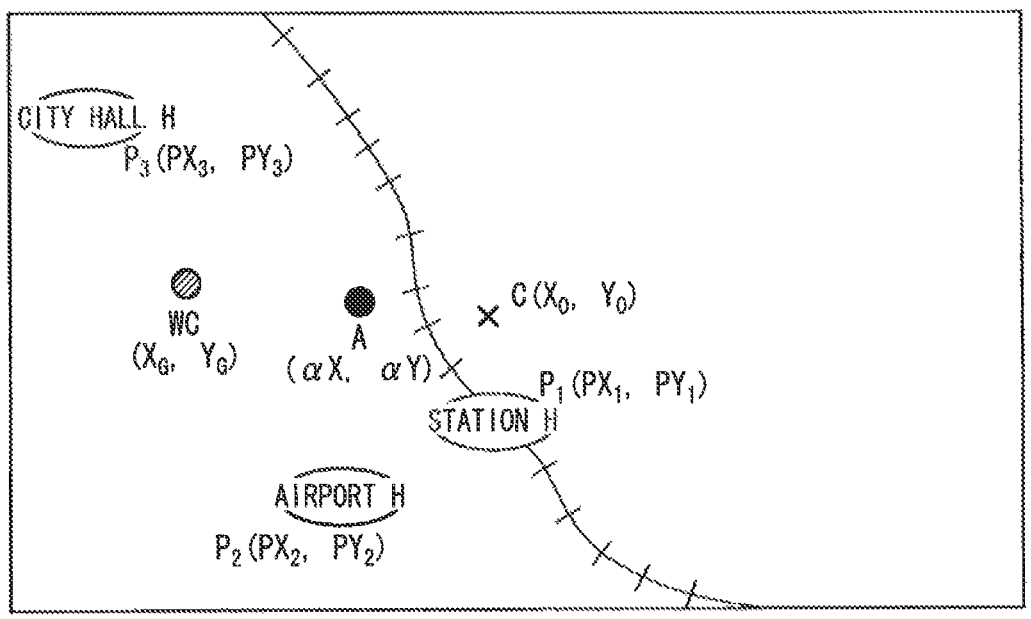
FIG. 17 is a diagram for explaining a coordinate amendment.

The following will explain the movement of the map display using the remote control 12 with an example when the map is moved from Station A in Prefecture A to Airport H in Prefecture H, wherein a real distance between Prefecture A to Prefecture H is more than 1,000 km away from each other. The remote control 12 controls a map display to permit an intended movement by moving to draw a manipulator locus indicated by Belt Arrow S1 and Belt Arrow S2 in FIG. 6. In this case, the control circuit 22 of the remote control 12 provides a final result due to the movement from Station A in Prefecture A to Airport H in Prefecture H with the locus of S1 and S2 in FIG. 6 as being identical to a final result due to the movement of a locus of four straight arrows from step 1 to step 5 via steps 2, 3, 4 in FIG. 7, although the map display during the movement from the start position to the end position may be differentiated from each other. In other words, FIG. 13 illustrating the start position starting the U-shaped S2 locus and FIG. 15 illustrating the end position ending the U-shaped S2 locus can be only identically displayed by two loci of the locus S2 of FIG. 6 and the locus from Step 2 to Step 5 via Steps 3, 4 in FIG. 7. Furthermore, the maps in FIGS. 13, 14 are not displayed during the movement of the U-shaped 52 locus. In any way, this enables the smooth movement of the remote control 12 and the display movement matching with an intuitive action.

Figure 12:
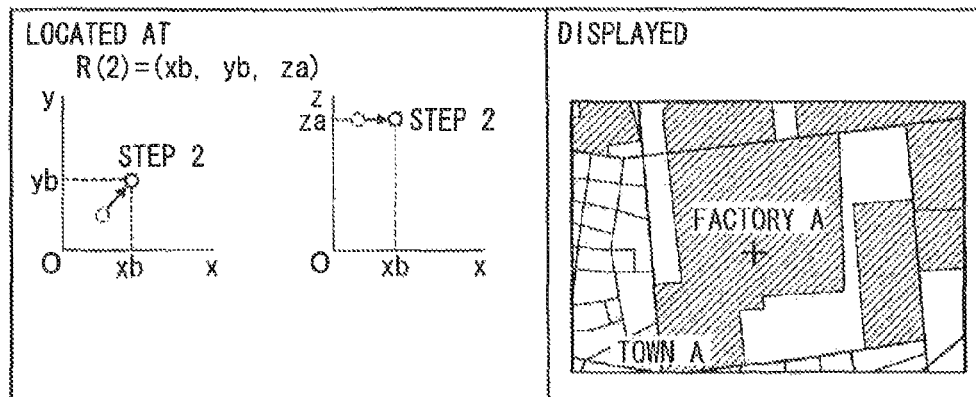
FIG. 12 is a diagram illustrating a coordinate set as a position of the remote control and a display window (Step 2)

The following will explain the case where the remote control 12 is moved in sequence from Step 1 to Step 5 with several straight lines without using the U-shaped locus S1. FIGS. 11 to 15 illustrate coordinate sets and displayed maps in the display portion 7 at respective positions R(1) to R(5) of Steps 1 to 5 where the remote control 12 is located in sequence. FIG. 11 illustrates a map of a vicinity of Station A and the position of the remote control 12 located at the position R(1)=(xa, ya, za) of Step 1. Then, the remote control 12 is moved on the horizontal plane from the position R(1) to the position R(2)=(xb, yb, za) of Step 2 so that a map of a vicinity around Factory A is displayed as illustrated in FIG. 12 with the reduced scale unchanged from the map in FIG. 11.

Then, the remote control 12 is moved downward in the vertical direction from the position R(2) to the position R(3)=(xb, yb, zb) of Step 3 so that a map of a region covering Prefecture A and neighboring Prefectures B, C, D is displayed as illustrated in FIG. 13 with the reduced scale decreased from the map in FIG. 12. Then, the remote control 12 is moved on the horizontal plane from the position R(3) to the position R(4)=(xc, yc, zb) of Step 4 so that a map of a region covering Prefecture H and neighboring Prefecture G is displayed as illustrated in FIG. 14 with the reduced scale unchanged from the map in FIG. 13. Then, the remote control 12 is moved upward in the vertical direction from the position R(4) to the position R(5)=(xc, yc, za) of Step 5 so that a map of a vicinity of Airport H in Prefecture H is displayed as illustrated in FIG. 15 with the reduced scale increased from the map in FIG. 14 so as to enlarge the map to highlighting Airport H as a destination.

In above Steps in sequence, either horizontal movement or vertical movement, namely, straight line movement, is applied to the remote control 12 with respect to the movement from a previous position to a next position. This includes movements unnatural for a user, causing the manipulability of the remote control 12 to be not user-friendly. To that end, the present embodiment permits the manipulator locus S2 in FIG. 6 to reach or obtain the same final destination (in FIG. 15) as the final destination of the movements in sequence in FIGS. 11 to 15.

Returning to FIG. 6, the locus of the remote control 12 includes the locus S1 being a horizontal movement and the locus S2 being a U-shaped or circular arc-shaped movement to draw a smooth circular arc. It is desirable that the map display movement from the manipulation of the remote control 12 in FIG. 6 reaches the same destination as the destination of the movement due to the manipulation of the remote control 12 in FIG. 7. Suppose that one movement of the remote control 12 is divided into several movement portions, each of which takes place for a short time period between adjoining two of the multiple detecting-times. If a displacement ΔR (Δx, Δy, Δz) of the remote control 12 is reflected, on a basis of a real time, on the map directly in response to each of the several movement portions of the position or coordinate sets R (x, y, z) of the remote control 12, the resultant map displayed may eventually indicate a position different from an intended position. This is because a plurality of reduced scales are obtained in response to the respective movement portions, resulting in calculating the respective horizontal movement amounts in response to the reduced scales, thereby moving the map differently.

Figure 6:
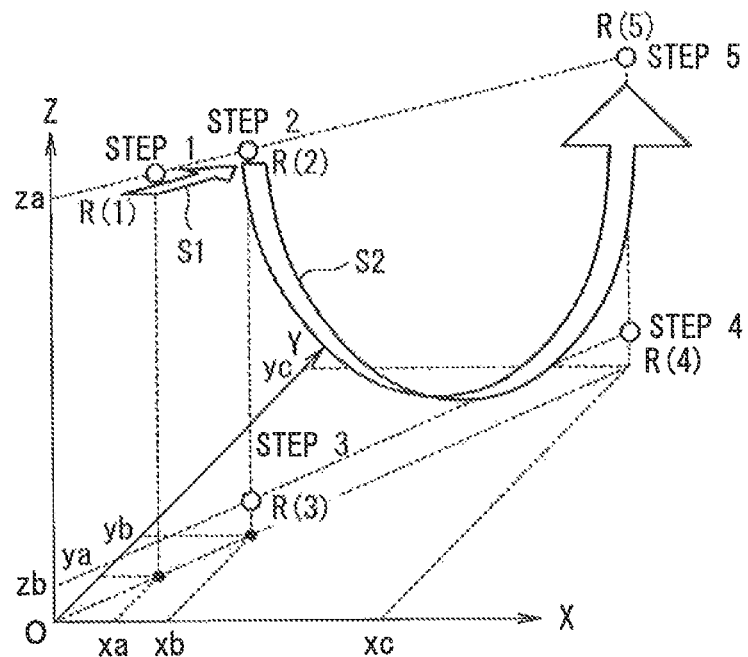
FIG. 6 is a diagram illustrating a U-shaped locus of the remote control in a three-dimensional coordinate system.
Figure 7:
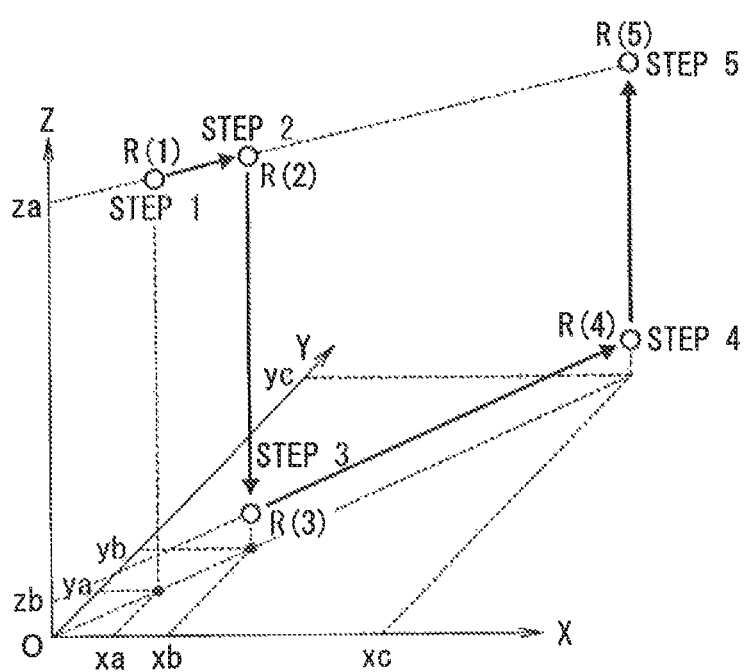
FIG. 7 is a diagram illustrating a rectangular locus of the remote control in a three-dimensional coordinate system.

The manipulator locus of the remote control 12 indicated by Belt Arrow 52 in FIG. 6 need provide the same final destination as the final destination from the movement of four straight arrows from Step 2 of the position R(2)=(xb, yb, za) to Step 5 of the position (R5)=(xc, yc, za) via Steps 3, 4 in FIG. 7. To fulfill this need, the present embodiment is provided with the following process.

Figure 8:
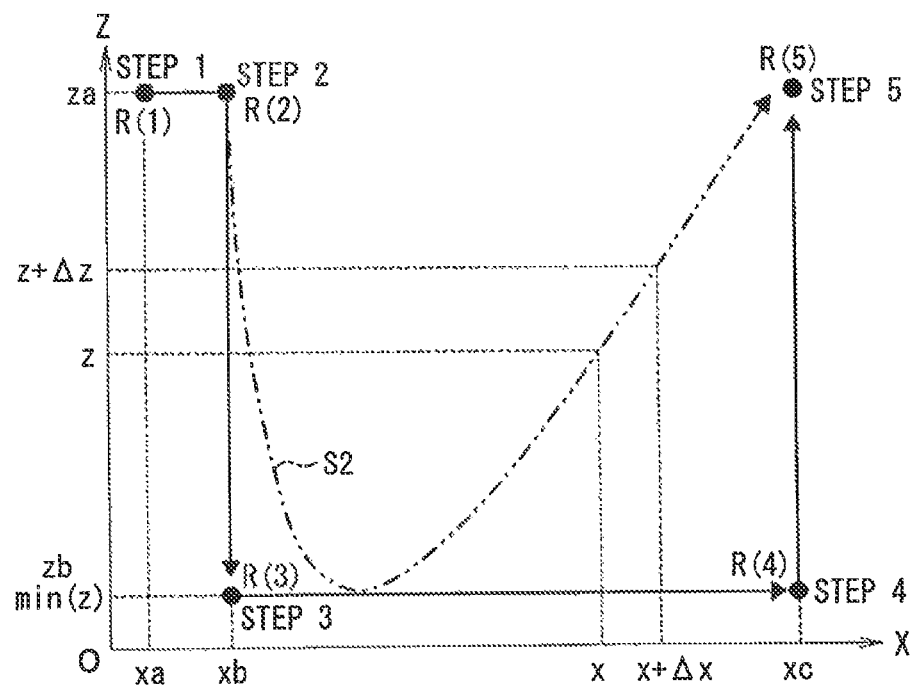
FIG. 8 is a diagram illustrating a locus of the remote control on an xz-coordinate plane.

See FIG. 8. The manipulator locus S2 performs an oblique movement in an oblique direction. The oblique movement includes a movement in the horizontal direction and a movement in the vertical direction instead of a movement only in one of the horizontal direction and the vertical direction. In this oblique movement, the level of the reduced scale is determined based on the vertical displacement when the remote control 12 comes to the lowest position min (z)=zb, and the horizontal movement amount is calculated based on the level of the reduced scale determined. Then, the final display is performed based on the reduced scale the level of which is determined by the position R (5) of Step 5.

Suppose that a subject manipulation moves from a subject movement start point to a subject movement end point via a subject vertically lowest point in the z direction. When the subject vertically lowest point, the subject movement start point, and the subject movement end point are same as those of the movement of the manipulator locus of S1 and S2, the map is certainly moved to the same on-map position as that of the movement of the manipulator locus of S1 and S2 unless the movement includes a movement only in one of the horizontal direction and the vertical direction. This permits the smooth manipulation of the remote control 12 like the manipulator locus 52, not needing the manipulation to draw a rectangle shape indicated in FIG. 7. This provides an improvement or advantage in the manipulation for displaying an intended, on-map position.

It is noted that the detection of the oblique displacement of the remote control 12 need be differentiated from either the simple horizontal displacement or simple vertical displacement in order to control the reduced scale. Which direction a user intends to manipulate among the oblique direction, the simple horizontal direction, and the simple vertical direction is not simply determined. This is because users have respective peculiarities. Setting thresholds in uniform conditions may be thus undesirable. The present embodiment provides a determination operation that considers the individual difference by executing a behavior detection of a remote control in FIG. 5 to be mentioned later. This provides users with the user-friendly manipulability considering the users individual difference or peculiarities when the users become accustomed to the manipulation of the remote control 12.

Further, when the map display is zoomed in by moving the remote control 12 upward, the display state is moved from a wide area under a small reduced scale to a narrow area under a large reduced scale. In such a case, it may be difficult for users to appropriately display an intended destination. In order to display the destination while enlarging it as appropriately as possible, the present embodiment provides an amendment to the X,Y coordinates of the center in the display window when zooming in.

The following procedure takes place.

(i) Designating POI (point of interest) spots Pk (k=1, 2 and 3, . . . )=(PXk, PYk) as specific on-map spots on the map.

(ii) Preparing a weighting list containing the POI spots Pk and weighting factors Wk0 previously assigned to the POI spots Pk, respectively.

(iii) Obtaining a weighted center position WC in the window from the weighting factors WkO of the POI spots in the window displayed.

(iv) Moving the weighted center position towards the coordinates (Xc, Yc) of the center C of the enlarged displayed map when zooming in in proportion to the reduced scale changing during the zooming-in.

This enables the destination to be easily contained within the displayed map or map window.

The POI spots in the list may include a spot that is designated as a destination by the user. Each time the user uses the navigation apparatus 1, the weighting factors WkO are varied in response to designating destinations. This enables the learning in response to the user's use history.

Figure 3:
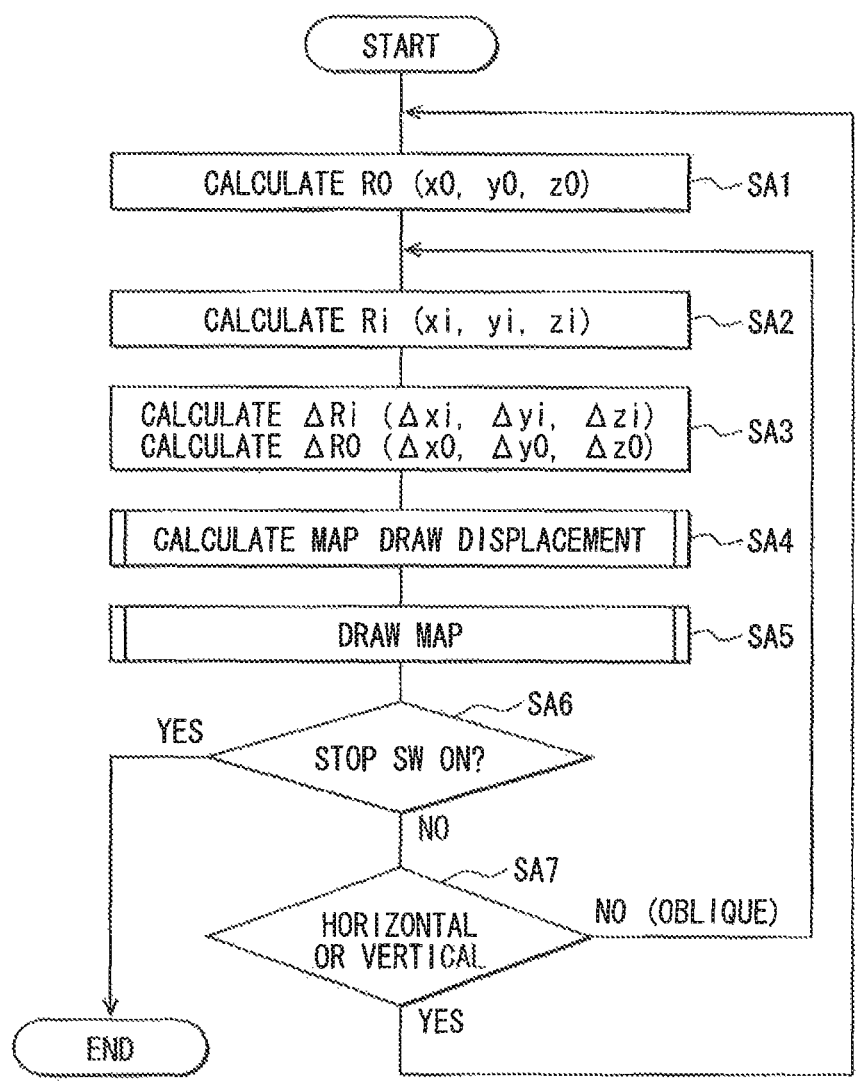
FIG. 3 is a flowchart diagram illustrating a process of a map display control in response to displacement of the remote control.
Figure 4:
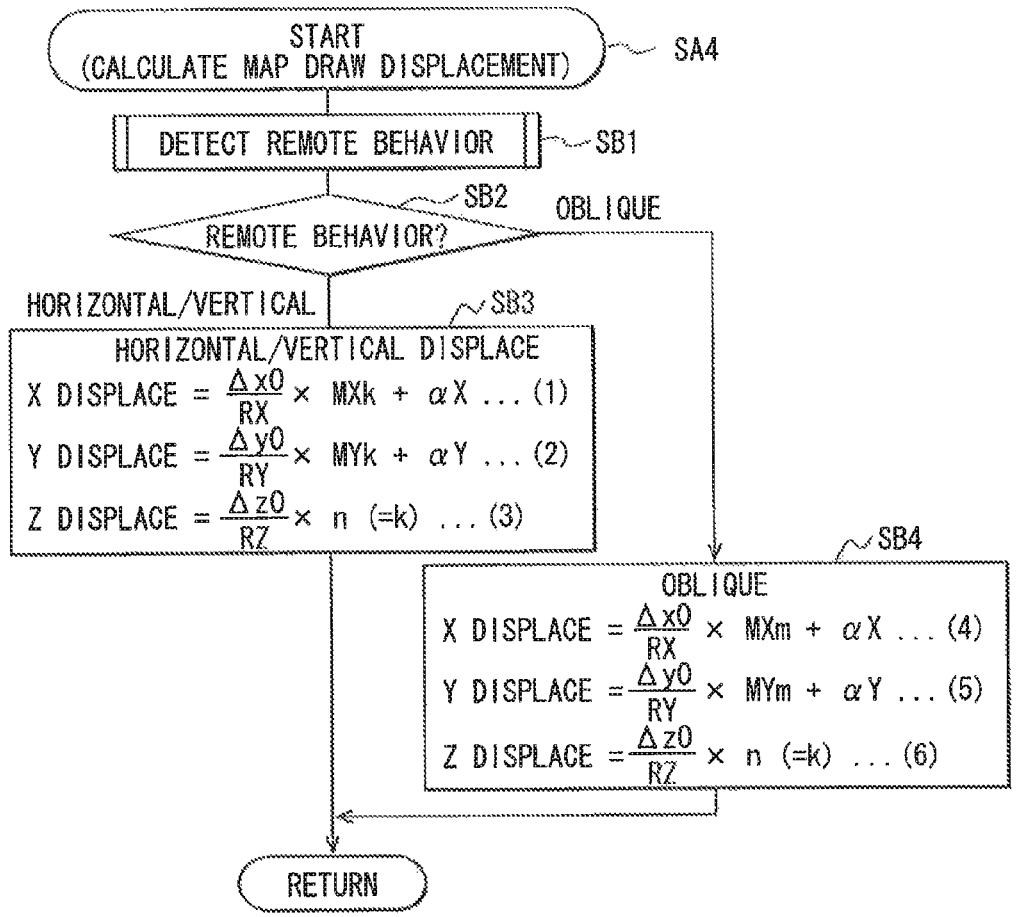
FIG. 4 is a flowchart diagram illustrating a process of a map drawing displacement calculation.
Figure 5:
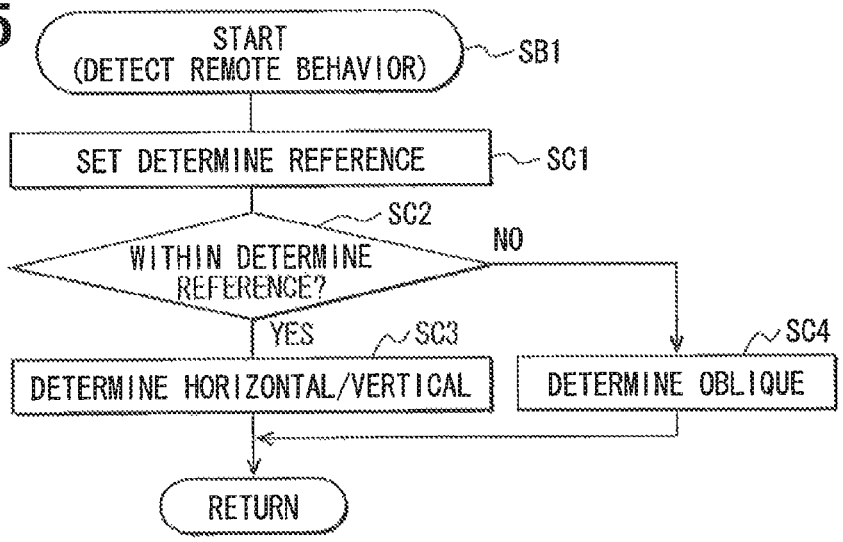
FIG. 5 is a flowchart diagram illustrating a process of a behavior detection of the remote control.

The following will explain a specific control process with reference to the flowcharts in FIG. 3-FIG. 5. Those flowcharts may be executed by only the control circuit 22 of the remote control 12 or by only the control circuit 2 of the navigation apparatus 1 as part of the overall control. In the present embodiment, those flowcharts are executed by cooperation of the control circuit 2 and the control circuit 22.

It is noted that a flowchart or the processing of the flowchart in the present application includes sections (also referred to as steps), each of which is represented, for instance, as SA1. Further, each section can be divided into several sub-sections while several sections can be combined into a single section. Furthermore, each of thus configured sections can be also referred to as a device, module, or means.

Each or any combination of sections explained in the above can be achieved as (i) a software section in combination with a hardware unit (e.g., computer) or (ii) a hardware section, including or not including a function of a related apparatus; furthermore, the hardware section may be constructed inside of a microcomputer.

Furthermore, the software section may be included in a software program, which may be contained in a non-transitory computer-readable storage media as a program product.

FIG. 3 illustrates a fundamental process by the manipulation of the remote control 12. A user manipulates the start button 25b to start an application of the map manipulation displayed on the display portion 26 of the remote control 12. The control circuit 22 thereby acquires displacement information of the remote control 12 according to the flowchart in FIG. 3.

First, the control circuit 22 acquires as position information the present position of the remote control 12, which is designated as a start position R0 (x0, y0, z0), based on a detection signal of the G sensor 23 (SA1). Then, the control circuit 22 acquires in series position information which indicates an i-th present position Ri of the remote control 12 at successive detecting-times with predetermined time intervals (SA2). The present position Ri (xi, yi, zi) of the remote control 12 indicates the i-th (=1, 2, 3, . . . ) measurement position from the start position R0. Thereby, the position Ri of the remote control 12 is calculated one by one with the predetermined time interval, and a displacement from the start position R0 may be detected.

Next, the control circuit 22 calculates, from the data of the positions R0, Ri−1, Ri of the remote control 12, one-time displacement $\Delta R0$ ($\Delta x0$, $\Delta y0$, $\Delta z0$) with respect to one measurement and cumulative displacement $\Delta Ri$ ($\Delta x$, $\Delta y$, $\Delta z$) with respect to the position Ri (SA3). The cumulative displacement $\Delta R0$ ($\Delta x0$, $\Delta y0$, $\Delta z0$) is a displacement accumulated from the start position R0. Each component of the one-time displacement $\Delta Ri$ ($\Delta x$, $\Delta y$, $\Delta z$) and the cumulative displacement $\Delta R0$ are obtained by the following equations.

$\Delta x = xi - xi-1$, $\Delta y = yi - yi-1$, $\Delta z = zi - zi-1$, $\Delta x0 = xi - x0$, $\Delta y0 = yi - y0$, and $\Delta z0 = zi - z0$. The control circuit 22 thereby calculates a map drawing displacement (SA4), and prepares map information on map, which the display portion 7 draws, based on the calculation result (SA5), transmitting the map information to the navigation apparatus 1 for the display portion 7 to display. The specific operations at SA4, SA5 will be explained later. Then, the control circuit 22 advances to SA7 when the stop switch 25c of the display portion 26 is not manipulated (SA6: NO), and ends the application when the stop switch 25c is manipulated (SA6: YES).

At SA7, the control circuit 22 determines a direction of the displacement of the remote control 12. When the remote control 12 moves in the horizontal direction or the vertical direction (SA7:YES), the processing returns to SA1. At SA1, the position of the remote control 12 at this time is calculated as a new start position R0. When the remote control 12 does not move in the horizontal direction or the vertical direction (SA7: NO), the processing returns to SA2 without changing the start position R0. At SA2, a new position Ri is calculated.

In addition, when the remote control 12 moves in the horizontal direction or the vertical direction after moving in the oblique direction, the determination at SA7 is affirmed (SA7: YES), the processing returns to SA1, where a new start position R0 is calculated.

As long as the oblique displacement by the manipulation of the remote control 12 continues, the start position R0 of the remote control 12 is not changed. The cumulative displacement is maintained unchanged at $\Delta R0$ from the start position R0. Therefore, the one smooth manipulation, i.e., the U-shaped manipulation 52 by the user permits the intended destination to be displayed, similarly to the several rectangle manipulations from Step 2 to Step 5 via Steps 3, 4 2. Thus, the user can feel a preferred usability and manipulability. In addition, when the manipulation is the simple horizontal displacement, the map is moved without the reduced scale changed. In contrast, when the manipulation is the simple vertical displacement, the map is enlarged or reduced based on the reduced scale according to the z coordinate without the center of the map moved.

Further, when the movement of the remote control 12 stops, the position is kept unchanged and the displacement is therefore zero. Even when the process continues, the display state does not change. Furthermore, when the displacement of the remote control 12 is stopped, the display operation may be generally stopped by manipulating the stop switch.

The following will explain the process at SA4 executed by the control circuit 22 for calculating the map drawing displacement with reference to the flowchart of FIG. 4. The control circuit 22 processes a behavior detection of the remote control 12 (SB1). At SB1, the determination process of a behavior is made in consideration of the individual difference of the user's manipulation of the remote control 12 from the behavior history in the past. Even if a user intends to manipulate the remote control 12 only in the vertical direction, i.e., the z direction, the remote control 12 may move also in the horizontal direction a little or zig-zag along the z axis. When such a little movement in the horizontal direction is accurately reflected on the calculation of the displacement of the remote control 12, the map may be moved in the horizontal direction despite the intention of the user. To that end, a tolerance value is appropriately determined according to the user's individual difference.

After detecting the behavior of the remote control 12, the control circuit 22 determines a horizontal/vertical displacement when the displacement is in one of the horizontal direction and vertical direction (SB2: Horizontal/Vertical). The control circuit 22 determines an oblique displacement when the displacement is not in one of the horizontal direction and vertical direction (SB2: Oblique). In the horizontal/vertical displacement, the control circuit 22 calculates each displacement of X, Y, and Z on the map according to the following equations (SB3).

$$X \text{ displacement} = \Delta x0/RX \times MXk + \alpha X \quad (1)$$

$$Y \text{ displacement} = \Delta y0/RY \times MYk + \alpha Y \quad (2)$$

$$Z \text{ displacement} = \Delta z0/RZ \times n(=k) \quad (3)$$

Herein, RX, RY, RZ are movement spans of the remote control in the X, Y, Z directions; MXk, MYk are a lateral span and longitudinal span at the level k of the reduced scale which is determined by the Z displacement obtained according to the equation (3); and $\alpha X$, $\alpha Y$ are correction values to the X direction and the Y direction on the map, which will be explain later.

In addition, in the oblique displacement, the control circuit 22 calculates each displacement of X, Y, Z on the map according to the following equations (SB4).

$$X \text{ displacement} = \Delta x0/RX \times MXm + \alpha X \quad (4)$$

$$Y \text{ displacement} = \Delta y0/RY \times MYm + \alpha Y \quad (5)$$

$$Z \text{ displacement} = \Delta z0/RZ \times n(=k) \quad (6)$$

Herein, MXm, MYm are a lateral span and longitudinal span at the level m of the reduced scale which is determined by the cumulative Z displacement obtained according to the equation (6); and the cumulative z displacement $\Delta z0$ is a vertical displacement when the remote control 12 comes to the lowest position min (z). This vertical displacement determines the level of the reduced scale, based on which the horizontal movement is then calculated.

The above processing determines whether the behavior of the remote control 12 corresponds to the horizontal/vertical displacement or the oblique displacement, obtaining those displacements based on the above equations. When calculating according to the above equations, $\alpha X$ or $\alpha Y$ is added in calculation of the X displacement or the Y displacement. The value of $\alpha X$ or $\alpha Y$ is a correction component that is calculated based on the following equations.

$$\alpha X = [\Sigma(Wk/D) \times (X - PXk)]/MX \times AX \quad (7)$$

$$\alpha Y = [\Sigma(Wk/D) \times (Y - PYk)]/MY \times AY \quad (8)$$

Herein, Wk is a weighting value of the k-th POI spot on the map; D, AX, and AY are predetermined correction coefficients; and PXk and PYk are coordinate values on the k-th POI spot on the map. In addition, indicates that the values of all the POI spots displayed on the display portion 7 are added.

The POI spot is a specific spot, which is convenient for someone to visit or interests someone, and is registered as spot data on the map. The spot data of the POI spot is previously assigned with a weighting factor. When the display of the map is enlarged, the map is moved to the position according to the magnitudes of the weight factors.

In specific, with reference to FIG. 16, the weighting factors are attached to the whole of the POI spots which exist in the display window. The method of assigning the weighting factors and selecting the POI spots may use the display class for display typically used in known navigation apparatuses. In FIG. 16, CASTLE A, CITY HALL A, MUSEUM A are examples of well known facilities and assigned with the weighting factors (WO) depending on degrees of name recognition. Well known facilities, places, or buildings on the map are designated as POI spots and assigned with weighting factors WkO.

Further, a place that a user designates as a destination is registered as a POI spot and assigned with a predetermined weighting factor WkO. Further, the number of designation times Ck the place is designated as a destination, the elapsed months Tk since designating as the destination previously are calculated. The weighting value Wk is thereby calculated based on those parameters as indicated by the following equation.

$$Wk = WkO \times \log(Ck/Tk) + WkO \quad (9)$$

Thereby, as the number of destination designation times Ck increases, the weighting value increases by multiplication of the logarithm thereof, enabling the reflection of the frequency of the designations as a destination. In addition, the number of destination designation times Ck is divided by the elapsed months since the previous designation. As the elapsed months increase, the weighting value decreases. The weighting value may be thus made according to the status of the destination designations, enabling easy recognition of the map display for the user. Thus, the k-th POI spot is assigned with the present total weighting value Wk, based on which an on-map position corresponding to the weighted center position is obtained. The value of $\alpha X$ or $\alpha Y$ may be obtained according to the above equations (7), (8) using the weighting value Wk.

Suppose that the vertical movement by the manipulation of the remote control 12 in FIG. 6 enlarges the map from a wide area to a narrow area and the center point C (X0, Y0) should be displayed at the center of the map window or displayed map under ordinary circumstances. Under the present embodiment, the consideration of the weighting value permits the amendment coordinate A ($\alpha X$, $\alpha Y$) to appear at the center of the window. In addition, main POI spots may be displayed when the map is enlarged.

The following will explain a determination process in consideration of the individual difference of the user in the behavior determination of the remote control 12 with reference to the flowchart of FIG. 5. The control circuit 22 prepares a determination reference by quantifying a variance resulting from the individual difference of the user to appropriately determine the user's manipulation of the remote control 12. That is, the control circuit 22 calculates a tolerance value or range to determine horizontal/vertical displacement in the distribution from the result of detecting the coordinates in the past N manipulations (for example, 100 manipulations) of the remote control 12, designating as a determination reference a threshold to determine whether the movement of the remote control 12 corresponds to either the horizontal/vertical displacement or the oblique displacement based on the determination reference designated (SC1).

Next, the control circuit 22 determines whether the value of the one-time displacement $\Delta Ri$ at the present time is within the determination reference (SC2). When within the determination reference (SC2: YES), the horizontal/vertical displacement is determined (SC3). When outside of the determination reference (SC2: NO), the oblique displacement is determined (SC4).

The configuration enables a smooth map display control in the display portion 7 based on the movement of the remote control 12. A map display control may be made in response to the frequency of the user's designation of destinations. An appropriate map display control may be made in consideration of the deviation or variance resulting from the user's individual difference. The user-friendly map display control may be provided for a new user or a frequent user.

The present embodiment provides the following advantages.

(1) The remote control 12 is displaced horizontally and vertically. This moves the on-map position on the map and changes the reduced scale of the map displayed in the display portion 7. Such a map display control of moving the map to indicate the same destination or region may be achieved by the manipulation of the remote control 12 drawing a circular arc S2 in FIG. 7 without need of the manipulation drawing the rectangle shape S2 to S5 in FIG. 6. Further, the manipulation of the remote control 12 by a user may be associated with the movement of the map to move closer to or farther from a predetermined portion of the user such as a shoulder connected with a hand holding the remote control 12 or eyes of the user, providing a simple usability along with a smooth movement of the map displayed.

(2) The weighting value Wk is assigned to a POI spot serving as a specific spot and stored as map information. The control circuit 2 calculates the weighted center position from the weighting values Wk of the POI spots displayed on the map window in the display portion 7, and displays the map such that the weighted center position shifts closer to the center position of the map window (i.e., displayed map) when enlarging the map by increasing the reduced scale. When enlarging a map on a basis of the center position of the map, the specific spots assigned with the weighting factors may be contained within the enlarged map displayed as much as possible by virtue of the weighting process, to easily recognize.

(3) The weighted center position is calculated to permit the balance of the moment values obtained from the products of (i) the distances between the coordinates of the POI spots in the map window and the coordinate of the weighted center position and (ii) the weighting values of the POI spots. When more than one specific spot exists in the map window, a specific spot having a higher weighting value is given a priority to display, enabling a user-friendly display operation for the user to easily confirm.

(4) When enlarging a map in the display portion 7 by increasing the reduced scale of the map, the weighted center position finally accords with the center position of the map window at the time when the reduced scale becomes a maximum. In this case, the distance or difference between the center position and the weighted center position is varied in proportion to each of instantaneous reduced scales up to the maximum reduced scale. The display state is shifted gradually to follow the manipulation enlarging the map, preventing the rapid display movement and achieving a natural display movement.

(5) The weighting value may be adjusted. That is, when the spot registered as a POI spot is designated as a destination, the weighting value Wk is increased as the number Ck of designation times increases. Further, the weighting value Wk is decreased as the elapsed time Tk since the previous designation becomes long. This may follow the action history of the user, and change the display manner based on the newest behavior information, resulting in producing a comprehensible display to prioritize a specific spot frequently visited.

(6) The weighting value Wk is calculated based on the equation (9). As the number Ck of designation times for a destination increases, the weighting value Wk increases by the logarithm of Ck, responding to the frequency of destination designations or the number of destination designation times. In addition, the number Ck of destination designation times is divided by the elapsed months Tk since the previous or last destination designation. As the elapsed months Tk increases, the weighting value may be decreased, responding to the destination designation history or status. The map display may be made easier to recognize.

(7) The displacement of the remote control 12 is assigned with a determination reference considering a tolerance value. That is, When the amount of the horizontal displacement does not reach the determination reference of the horizontal displacement, it is determined that the horizontal displacement is not present. When the amount of the vertical displacement does not reach the determination reference of the vertical displacement, it is determined that the vertical displacement is not present. Suppose that although the user intends to manipulate the remote control 12 in the horizontal direction or the vertical direction, the remote control 12 may be manipulated in an oblique direction a little or draw a zig-zag movement. Such a zig-zag movement may be processed statistically to obtain a variance or deviation, which may be reflected on a tolerance value or determination reference. Thus, the manipulability may be improved by virtue of providing the tolerance value or range.

(8) The determination references of the horizontal displacement and the vertical displacement are designated based on the multiple displacements in the past. Even when the manipulation varies due to the individual difference of users, the displacement may be determined in consideration of the users' peculiarities. This enhances the usability.

(9) The determination references of the horizontal displacement and the vertical displacement may be designated based on the distributed values or variances calculated from the past multiple displacements. Even when the manipulations of the user vary, such a variation may be followed and flexibly responded to, enhancing the usability.

(10) The G sensor 23 is provided to the remote control 12 as a position detector. The movement of the remote control 12 may be acquired using the acceleration signals to calculate a position, which is used to detect a displacement. Detecting a position of the remote control 12 may be thus made by a simple configuration.

Other Embodiments

The flowchart in FIG. 3 executed by the control circuit 22 may be executed by the control circuit 2 of the navigation apparatus 1. In addition, two of the control circuits 22, 2 may share the flowchart.

The smart phone serving as the remote control 12 is used as a manipulator. A general cellular phone, another portable terminal, or a dedicated remote control may be used as a manipulator. The weighting factor WO of the POI spot may be set up as needed. In addition, the weighting factor WO may be set up depending on the tendency of a user in consideration of the degrees of designating destinations.

The variation of the weighting value W of the POI spot may not be calculated only based on the equation (9). Another equation may provide a tendency where as the number of destination designation times increases, the value increases, and another tendency where as the elapsed time since the previous designation increases, the value decreases.

How to determine either the simple horizontal/simple vertical manipulation or the oblique manipulation of the remote control 12 may not be limited to the above embodiment. It may be associated with the individual difference of the user and learnt subsequently.

The coordinate system of x, y, z axes which indicates the position of the remote control 12 is based on the gravity direction being the z direction. There is no need to be limited thereto. The manipulation surface of the remote control 12 may be designated as the xy-coordinate plane while the direction orthogonal to the manipulation surface may be designated as the z axis or direction. Further, the screen or map window of the display portion 7 may be designated as the xy-coordinate plane while the direction orthogonal to the screen may be designated as the z axis or direction that may be a direction to move closer to or farther from the screen.

The various sensors may be used as a position detector in addition to the G sensor 23. For example, the position may be recognized optically or using signals of ultrasonic waves.

The present embodiment is applied to the vehicular navigation apparatus 1. Without need to be limited thereto, it may be applied to a navigation apparatus that is carried by a user or applied to an apparatus having a manipulator to control a map display in a display portion.

Aspects of the Present Embodiment

Aspects of the present embodiment described herein are set out in the following clauses.

A first aspect of the present embodiment of the present disclosure may be recited as follows. A map display manipulation apparatus 1 may be provided to include a display portion 7, a manipulator 12, a position detector 23, and a control circuit 2, 22. The display portion 7 performs a map display to display a map based on map information. The manipulator 12 performs a manipulation to the map display. The manipulator may be displaced in a three-dimensional coordinate system of x axis, y axis, and z axis, the x, y, and z axes being mutually orthogonal. The manipulator displaced parallel with the x axis and the y axis permits the map to move laterally and longitudinally, respectively. The manipulator displaced parallel with the z axis permits a reduced scale of the map to change such that as a z coordinate becomes lower, the reduced scale decreases to permit a displayed map in the display portion to cover a wider area. The position detector 23 detects and outputs a coordinate set as a position of the manipulator in the three-dimensional coordinate system at each of successive detecting times during a detection duration from an initial detecting time via middle detecting times to a present detecting time.

The control circuit 2, 22 controls the map display in the display portion on a basis of a real time in response to receiving each of the coordinate sets of the manipulator during the detection duration. The control circuit performs an initial operation to display the map under an initial reduced scale with an initial map-center position centered in the display portion when receiving an initial coordinate set (R0 (x0, y0, z0)) at the initial detecting time.

The control circuit performs a present-time operation when receiving a present coordinate set (Ri (xi, yi, zi)) at the present detecting time after receiving middle coordinate sets (Rf (xf, yf, zf)) at the middle detecting times from the position detector. The present-time operation takes place as follows: (i) determining whether only an oblique locus is drawn by determining whether any portion of a locus of the manipulator drawn during the detection duration from the initial detecting time via the middle detecting times to the present detecting time corresponds to an oblique locus that is neither parallel with the z axis nor orthogonal to the z axis, and (ii) processing a present-time map display when it is determined that only the oblique locus is drawn.

The present-time map display takes place as follows: (i) calculating a cumulative displacement ($\Delta R0$ ($\Delta x0$, $\Delta y0$, $\Delta z0$)) between the present coordinate set (Ri (xi, yi, zi)) and the initial coordinate set, the cumulative displacement ($\Delta R0$ ($\Delta x0$, $\Delta y0$, $\Delta z0$)) having a cumulative x displacement ($\Delta x0$), a cumulative y displacement ($\Delta y0$), and a cumulative z displacement ($\Delta z0$), (ii) calculating a lowest z coordinate among the initial z coordinate (z0), the middle z coordinates (zf), and the present z coordinate (zi), and (iii) displaying the map under a present reduced scale based on the present z coordinate (zi) with a new map-center position centered in the display portion, the new map-center position being away from the initial map-center position laterally by a first product and longitudinally by a second product. Herein, the first product is obtained by multiplying the cumulative x displacement ($\Delta x0$) by a first unit distance (MXm) according to a reduced scale based on the lowest z coordinate; the second product is obtained by multiplying the cumulative y displacement ($\Delta y0$) by a second unit distance (MYm) according to the reduced scale based on the lowest z coordinate.

Such a featured configuration described above can provide an advantage that may be illustrated in FIGS. 18A, 18B, 18C, 18D as compared with FIGS. 19, 20A, 20B, and 21. First, refer to FIG. 18A in which a map movement may be made by a rectangle displacement by displacing the manipulator along the z axis from the start position "START" (xb, za) to the lowest z coordinate (xb, zb), then displacing the manipulator orthogonally to the z axis to the position (xc, zb) having the lowest zb coordinate and finally displacing the manipulator along the z axis to the goal position "END" (xc, za), thereby moving the displayed map containing SPOT 1. However, such a rectangle displacement of the manipulator is a troublesome for a user; thus, the above featured configuration of the present embodiment is provided for a user-friendly manipulation of the manipulator.

Figure 18A:
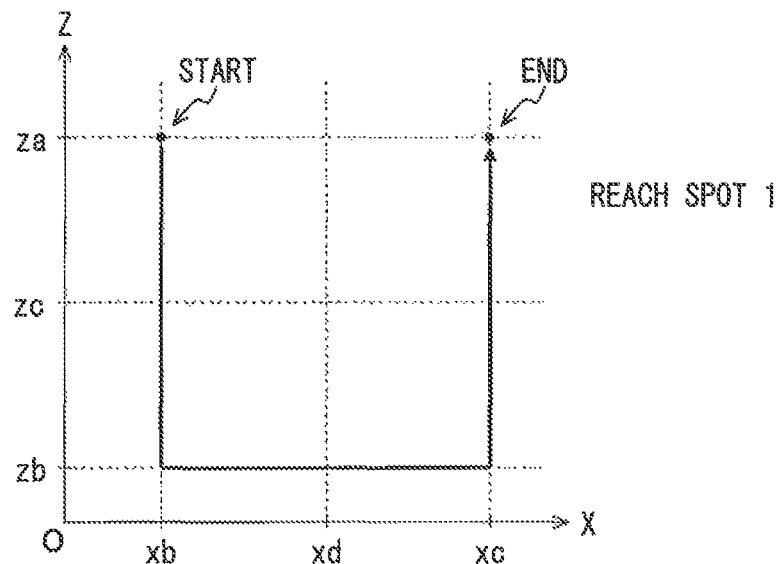
FIGS. 18A, 18B, 18C, 18D are diagrams illustrating lad of the remote control to move the map to contain Spot 1 in the display portion.
Figure 18B:
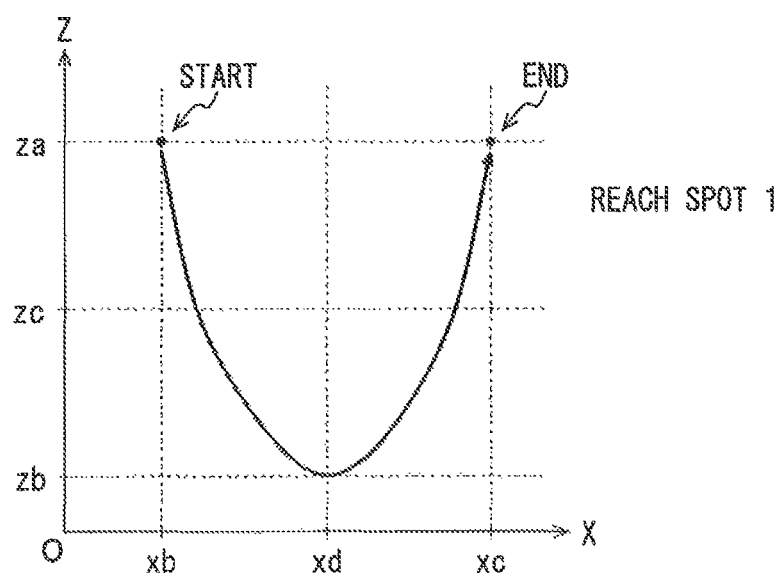
Figure 18C:
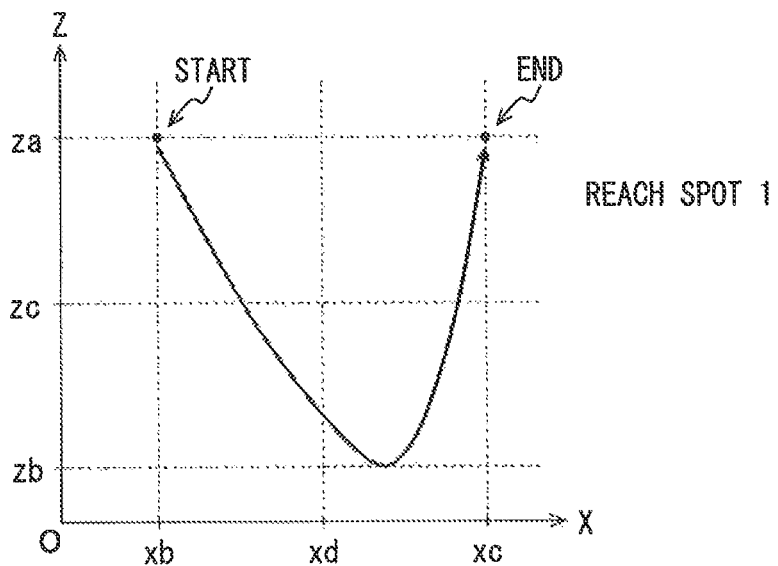
Figure 18D:
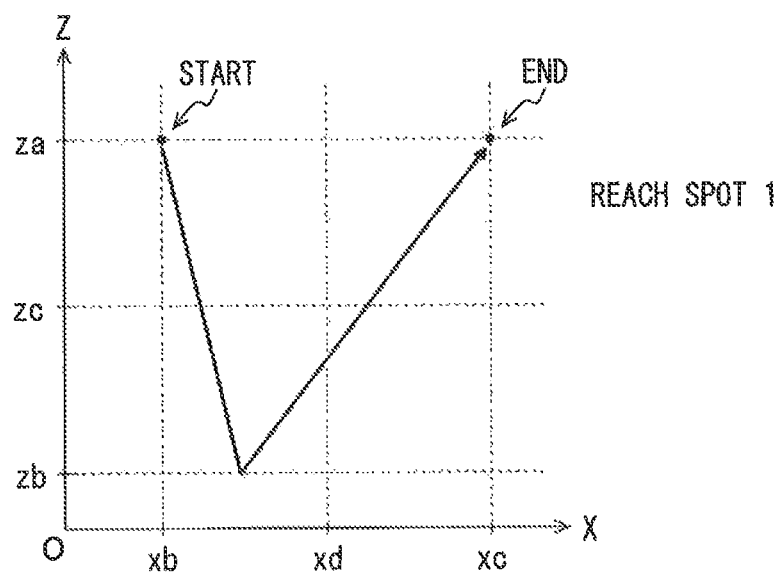
Figure 19:
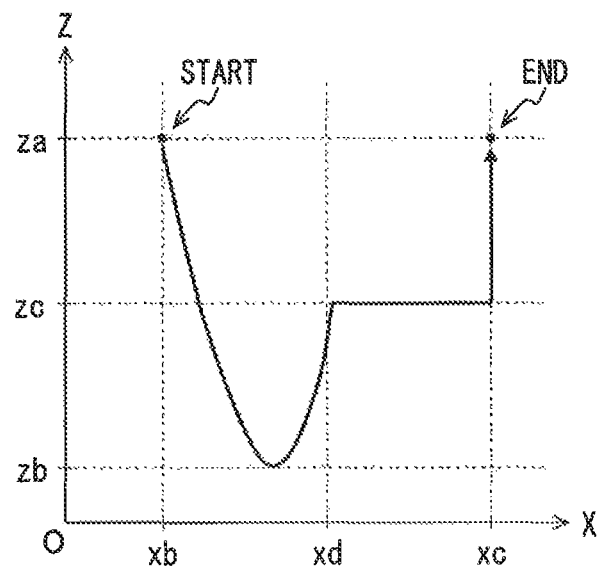
FIG. 19 is a diagram illustrating a locus of the remote control to move the map to contain Spot 2, beyond which Spot 1 is existing.
Figure 20A:
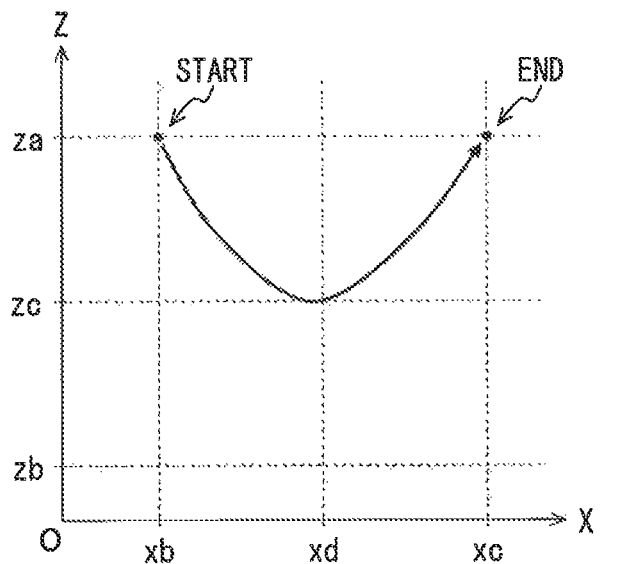
FIGS. 20A, 20B are diagrams illustrating loci of the remote control to move the map to contain Spot 3, beyond which Spot 1 is existing.
Figure 20B:
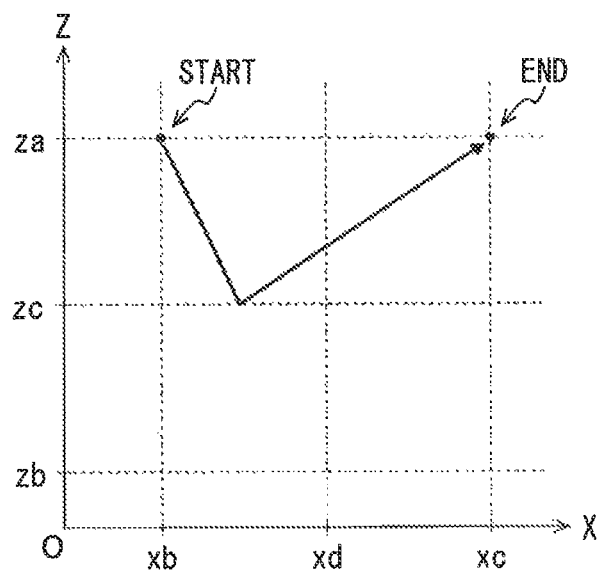
Figure 21:
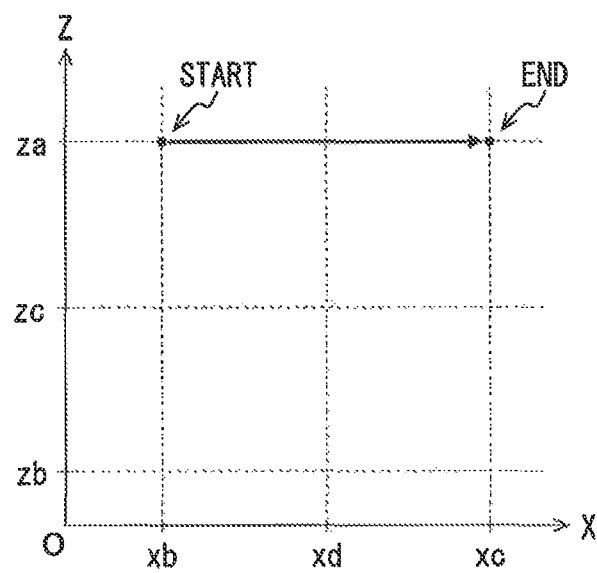
FIG. 21 is a diagram illustrating a locus of the remote control to move the map to contain Spot 4, beyond which Spot 1 is existing.

Further, refer to FIG. 18B. As illustrated, the manipulator 12 is displaced to draw a U-shaped locus without any partial displacement parallel with the z axis or orthogonal to the z axis from the start position to the goal position via a first bottom of the U-shaped locus having the lowest zb coordinate, changing an initial displayed map to an intended displayed map containing the SPOT 1. In such a case, under the configuration of the above example of the present disclosure, as long as any different U-shaped locus (see FIG. 18C) or V-shaped locus (see FIG. 18D) of the manipulator 12 is drawn from the same start position to the same goal position while having the same lowest zb coordinate without any partial displacement parallel with the z axis or orthogonal to the z axis, the displayed map is changed from the initial displayed map to the intended displayed map, equivalently.

Further, see FIGS. 19, 20A, 20B, 21, which illustrate different loci. That is, each of the lad does not satisfy the above condition: the manipulator 12 is drawn from the same start position to the same goal position while having the same lowest zb coordinate without any partial displacement parallel with the z axis or orthogonal to the z axis. Therefore, the lad illustrated in FIGS. 19, 20A, 20B, 21 change displayed maps from the start displayed map to the respective displayed maps contain SPOT 2, SPOT 3, and SPOT 4 without reaching SPOT 1. Those SPOT 2, SPOT 3, and SPOT 4 are existing between the start on-map position and SPOT 1.

Further, as a second aspect of the present embodiment, a map display manipulation apparatus 1 may be provided to include the display portion 7, the manipulator 12, the position detector 23, and the control circuit 2, 22, similar to the first aspect. Herein, the position detector 23 detects and outputs a coordinate set as a position of the manipulator in the three-dimensional coordinate system at each of successive detecting times from an initial detecting time to subsequent detecting times. The control circuit 2, 22 controls the map display in the display portion on a basis of a real time in response to receiving the coordinate set of the manipulator at each of the successive detecting times.

The control circuit performs an initial operation when receiving an initial coordinate set (R0 (x0, y0, z0)) at the initial detecting time from the position detector. The initial operation takes place as follows: (i) assigning a reference coordinate set of the manipulator with a value of the initial coordinate set (R0 (x0, y0, z0)), (ii) assigning a reference lowest z coordinate with a value of the initial z coordinate (z0), (iii) displaying the map under an initial, reduced scale with an initial map-center position centered in the display portion, and (iv) assigning a reference map-center position with a value of the initial map-center position.

The control circuit performs a subsequent operation when receiving a subsequent coordinate set (Ri (xi, yi, zi)) at a subsequent detecting time after the initial detecting time from the position detector. The subsequent operation takes place as follows: (i) calculating a one-time displacement ($\Delta$Ri ($\Delta$xi, $\Delta$yi, $\Delta$zi)) between the subsequent coordinate set (Ri (xi, yi, zi)) and a previous coordinate set (Ri–1 (xi–1, yi–1, zi–1)), which is outputted from the position detector at a previous detecting time that is just previous to the subsequent detecting time, the one-time displacement ($\Delta$Ri ($\Delta$xi, $\Delta$yi, $\Delta$zi)) having a one-time x displacement ($\Delta$xi), a one-time y displacement ($\Delta$yi), and a one-time z displacement ($\Delta$zi), (ii) calculating a cumulative displacement ($\Delta$R0 ($\Delta$x0, $\Delta$y0, $\Delta$z0)) between the subsequent coordinate set (Ri (xi, yi, zi)) and a present value of the reference coordinate set, the cumulative displacement ($\Delta$R0 ($\Delta$x0, $\Delta$y0, $\Delta$z0)) having a cumulative x displacement ($\Delta$x0), a cumulative y displacement ($\Delta$y0), and a cumulative z displacement ($\Delta$z0), and (iii) determining whether the one-time displacement ($\Delta$Ri ($\Delta$xi, $\Delta$yi, $\Delta$zi)) corresponds to a z-oblique displacement, z-orthogonal displacement, or a z-parallel displacement. The z-oblique displacement is neither parallel with the z axis nor orthogonal to the z axis. The z-orthogonal displacement is orthogonal to the z axis. The z-parallel displacement is parallel with the z axis.

(a) When it is determined that the one-time displacement corresponds to the z-oblique displacement, the subsequent operation then further takes place as follows: (i) comparing a present value of the reference lowest z coordinate with a subsequent value of the subsequent z coordinate (z1) and assigning the reference lowest z coordinate with a lower value of the present value and the subsequent value, (ii) displaying the map under a subsequent reduced scale based on the subsequent z coordinate (z1 with a first new map-center position centered in the display portion, the first new map-center position being away from the reference map-center position laterally by a first product and longitudinally by a second product, the first product being obtained by multiplying the cumulative x displacement ($\Delta$x0) by a first unit distance (MXm) according to a lowest reduced scale based on the reference lowest z coordinate, the second product being obtained by multiplying the cumulative y displacement ($\Delta$y0) by a second unit distance (MYm) according to the lowest reduced scale based on the reference lowest z coordinate, (iii) maintaining unchanged a present value of the reference map-center position, and (iv) maintaining unchanged a present value of the reference coordinate set.

Further, the following may be an optional configuration. That is, (b) when it is determined that the one-time displacement corresponds to the z-orthogonal displacement, the subsequent operation then further takes place as follows: (i) assigning newly the reference lowest z coordinate with a value of the subsequent z coordinate (zi), (ii) moving the map, which was in a displayed state in the display portion after a subsequent operation at the previous detecting time, laterally by a third product and longitudinally by a fourth product, to thereby contain a second new map-center position centered in the display portion, the third product being obtained by multiplying the one-time x displacement ($\Delta$xi) by a third unit distance (MXk) according to the subsequent reduced scale based on the subsequent z coordinate (zi), the fourth product being obtained by multiplying the subsequent-time x displacement ($\Delta$yi) by a fourth unit distance (MYk) according to the subsequent reduced scale based on the subsequent z coordinate (zi), (iii) assigning newly the reference map-center position with a value of the second new map-center position, and (iv) assigning newly the reference coordinate set with a value of the subsequent coordinate set (Ri (xi, yi, zi)).

(c) When it is determined that the one-time displacement corresponds to the z-parallel displacement, the subsequent operation then further takes place as follows: (i) assigning newly the reference lowest z coordinate with a value of the subsequent z coordinate (zi), (ii) changing the reduced scale of the map, which was in a displayed state to contain a third new map-center position centered in the display portion after a subsequent operation at the previous detecting time, to a subsequent reduced scale based on the subsequent z coordinate (zi), (iii) assigning newly the reference map-center position with a value of the third new map-center position, and (iv) assigning newly the reference coordinate set with a value of the subsequent coordinate set (Ri (xi, yi, zi)).

Such a featured configuration described above can provide an advantage similar to that of the first aspect.

According to an optional aspect, the z axis may be along a direction extending to move farther from a predetermined portion of a human body of a user, who holds the manipulator and sees the map display in the display portion from a predetermined position. As the manipulator is displaced to move along the z axis farther from the predetermined portion, a reduced scale of the map may decrease to thereby reduce the map and cover a wider area whereas as the manipulator is displaced to move along the z axis closer to the predetermined portion, the reduced scale of the map may increase to thereby enlarge the map and cover a narrower area.

Further, the predetermined portion of the body may be a shoulder that is connected with a hand holding the manipulator via an arm.

According to another optional aspect, the z axis may be along a direction of gravity; and as the manipulator is displaced to move along the z axis downward, a reduced scale of the map may decrease to thereby reduce the map and cover a wider area whereas as the manipulator is displaced to move along the z axis upward, the reduced scale of the map may increase to thereby enlarge the map and cover a narrower area.

According to another optional aspect, the z axis may be along a direction orthogonal to the map display in the display portion; and as the manipulator is displaced to move along the z axis closer to the map display, a reduced scale of the map may decrease to thereby reduce the map and cover a wider area whereas as the manipulator is displaced to move along the z axis farther away from the map display, the reduced scale of the map may increase to thereby enlarge the map and cover a narrower area.

According to another optional aspect, the map information may store specific spots that are assigned with respective weighting factors. The control circuit may calculate a weighted center from specific spots that are contained in the map display. When the reduced scale is increased, the weighted center may be shifted to approach a map-center position in the display portion or the map display.

Further, the control circuit may calculate the above weighted center such that moment values of the specific spots in the map display are balanced at the weighted center; and the moment value of a subject specific spot of the specific spots may be a product obtained by multiplying the weighting factor of the subject specific spot and a distance between a coordinate set of the subject specific spot and the weighted center.

Yet further, when the reduced scale is increased to a predetermined maximum reduced scale, the weighted center may be shifted to the center position of the map display.

Yet further, in cases that the subject specific spot is designated as a destination n times the control circuit may perform an adjustment to adjust the weighting factor of a subject specific spot such that the weighting factor is increased as the n increases whereas the weighting factor is decreased as an elapsed time increases since the subject specific spot is designated the n times.

Yet further, the control circuit may perform the adjustment to obtain an adjusted weighting value according to an equation of $W=W0\times\log(C/T)+W0$, wherein W is an adjusted weighting value, W0 is a predetermined weighting factor, C is a number of times of destination designations, T is an elapsed time since a most recent destination designation.

According to another optional aspect, when the control circuit determines whether the one-time displacement corresponds to the z-oblique displacement, a tolerance value may be provided with respect to each of the one-time x displacement, the one-time y displacement, and the one-time z displacement for determining.

Yet further, the tolerance value may be determined based on a variance of a plurality of one-time displacements at a plurality of detecting times.

According to another optional aspect, the manipulator may include a remote control; and the position detector may include an acceleration sensor provided in the remote control.

While the present disclosure has been described with reference to preferred embodiments thereof, it is to be understood that the disclosure is not limited to the preferred embodiments and constructions. The present disclosure is intended to cover various modification and equivalent arrangements. In addition, while the various combinations and configurations, which are preferred, other combinations and configurations, including more, less or only a single element, are also within the spirit and scope of the present disclosure.

What is claimed is:

1. A map display manipulation apparatus comprising:
    a display portion to perform a map display to display a map based on map information;
    a manipulator to perform a manipulation to the map display, the manipulator being displaced in a three-dimensional coordinate system of x axis, y axis, and z axis, the x, y, and z axes being mutually orthogonal,
        the manipulator displaced parallel with the x axis and the y axis permitting the map to move laterally and longitudinally, respectively,
        the manipulator displaced parallel with the z axis permitting a reduced scale of the map to change such that as a z coordinate becomes lower, the reduced scale decreases to permit a displayed map in the display portion to cover a wider area;
    a position detector to detect and output a coordinate set as a position of the manipulator in the three-dimensional coordinate system at each of successive detecting times during a detection duration from an initial detecting time via middle detecting times to a present detecting time; and
    a control circuit to control the map display in the display portion on a basis of a real time in response to receiving each of the coordinate sets of the manipulator during the detection duration,
    the control circuit performing an initial operation to display the map under an initial reduced scale with an initial map-center position centered in the display portion when receiving an initial coordinate set at the initial detecting time,
    the control circuit performing a present-time operation when receiving a present coordinate set at the present detecting time after receiving middle coordinate sets at the middle detecting times from the position detector,
    the present-time operation
        (i) determining whether only an oblique locus is drawn by determining whether any portion of a locus of the manipulator drawn during the detection duration from the initial detecting time via the middle detecting times to the present detecting time corresponds to an oblique locus that is neither parallel with the z axis nor orthogonal to the z axis, and
        (ii) processing a present-time map display when it is determined that only the oblique locus is drawn,
        the present-time map display
            (i) calculating a cumulative displacement between the present coordinate set and the initial coordinate set, the cumulative displacement having a cumulative x displacement, a cumulative y displacement, and a cumulative z displacement,
            (ii) calculating a lowest z coordinate among the initial z coordinate, the middle z coordinates, and the present z coordinate, and
            (iii) displaying the map under a present reduced scale based on the present z coordinate with a new map-center position centered in the display portion, the new map-center position being away from the initial map-center position laterally by a first product and longitudinally by a second product,
        the first product being obtained by multiplying the cumulative x displacement by a first unit distance according to a reduced scale based on the lowest z coordinate,
        the second product being obtained by multiplying the cumulative y displacement by a second unit distance according to the reduced scale based on the lowest z coordinate.

2. The map display manipulation apparatus according to claim 1, wherein:
    the z axis is along a direction extending to move farther from a predetermined portion of a human body of a user, who holds the manipulator and sees the map display in the display portion from a predetermined position; and
    as the manipulator is displaced to move along the z axis farther from the predetermined portion, a reduced scale of the map decreases to thereby reduce the map and cover a wider area whereas as the manipulator is displaced to move along the z axis closer to the predetermined portion, the reduced scale of the map increases to thereby enlarge the map and cover a narrower area.

3. The map display manipulation apparatus according to claim 2, wherein:
the predetermined portion of the body is a shoulder that is connected with a hand holding the manipulator via an arm.

4. The map display manipulation apparatus according to claim 1, wherein:
the map information stores specific spots that are assigned with respective weighting factors;
the control circuit calculates a weighted center from specific spots that are contained in the map display; and
when the reduced scale is increased, the weighted center is shifted to approach a map-center position centered in the map display portion.

5. The map display manipulation apparatus according to claim 1, wherein:
the manipulator includes a remote control; and
the position detector includes an acceleration sensor provided in the remote control.

6. A map display manipulation apparatus comprising:
a display portion to perform a map display to display a map based on map information;
a manipulator to perform a manipulation to the map display, the manipulator being displaced in a three-dimensional coordinate system of x axis, y axis, and z axis, the x, y, and z axes being mutually orthogonal,
the manipulator displaced parallel with the x axis and the y axis permitting the map to move laterally and longitudinally, respectively,
the manipulator displaced parallel with the z axis permitting a reduced scale of the map to change such that as a z coordinate becomes lower, the reduced scale decreases to permit a displayed map in the display portion to cover a wider area;
a position detector to detect and output a coordinate set as a position of the manipulator in the three-dimensional coordinate system at each of successive detecting times from an initial detecting time to subsequent detecting times; and
a control circuit to control the map display in the display portion on a basis of a real time in response to receiving the coordinate set of the manipulator at each of the successive detecting times,
the control circuit performing an initial operation when receiving an initial coordinate set at the initial detecting time from the position detector,
the initial operation
(i) assigning a reference coordinate set of the manipulator with a value of the initial coordinate set,
(ii) assigning a reference lowest z coordinate with a value of the initial z coordinate,
(iii) displaying the map under an initial reduced scale with an initial map-center position centered in the display portion, and
(iv) assigning a reference map-center position with a value of the initial map-center position,
the control circuit performing a subsequent operation when receiving a subsequent coordinate set at a subsequent detecting time after the initial detecting time from the position detector,
the subsequent operation
(i) calculating a one-time displacement between the subsequent coordinate set and a previous coordinate set, which is outputted from the position detector at a previous detecting time that is just previous to the subsequent detecting time, the one-time displacement having a one-time x displacement, a one-time y displacement, and a one-time z displacement,
(ii) calculating a cumulative displacement between the subsequent coordinate set and a present value of the reference coordinate set, the cumulative displacement having a cumulative x displacement, a cumulative y displacement, and a cumulative z displacement, and
(iii) determining whether the one-time displacement corresponds to a z-oblique displacement being neither parallel with the z axis nor orthogonal to the z axis,
the subsequent operation then further,
when it is determined that the one-time displacement corresponds to the z-oblique displacement,
(i) comparing a present value of the reference lowest z coordinate with a subsequent value of the subsequent z coordinate and assigning the reference lowest z coordinate with a lower value of the present value and the subsequent value,
(ii) displaying the map under a subsequent reduced scale based on the subsequent z coordinate with a first new map-center position centered in the display portion, the first new map-center position being away from the reference map-center position laterally by a first product and longitudinally by a second product,
the first product being obtained by multiplying the cumulative x displacement by a first unit distance according to a lowest reduced scale based on the reference lowest z coordinate,
the second product being obtained by multiplying the cumulative y displacement by a second unit distance according to the lowest reduced scale based on the reference lowest z coordinate,
(iii) maintaining unchanged a present value of the reference map-center position, and
(iv) maintaining unchanged a present value of the reference coordinate set.

7. The map display manipulation apparatus according to claim 6, wherein:
the z axis is along a direction extending to move farther from a predetermined portion of a human body of a user, who holds the manipulator and sees the map display in the display portion from a predetermined position; and
as the manipulator is displaced to move along the z axis farther from the predetermined portion, a reduced scale of the map decreases to thereby reduce the map and cover a wider area whereas as the manipulator is displaced to move along the z axis closer to the predetermined portion, the reduced scale of the map increases to thereby enlarge the map and cover a narrower area.

8. The map display manipulation apparatus according to claim 7, wherein:
the predetermined portion of the body is a shoulder that is connected with a hand holding the manipulator via an arm.

9. The map display manipulation apparatus according to claim 6, wherein:
the z axis is along a direction of gravity; and
as the manipulator is displaced to move along the z axis downward, a reduced scale of the map decreases to thereby reduce the map and cover a wider area whereas as the manipulator is displaced to move along the z axis upward, the reduced scale of the map increases to thereby enlarge the map and cover a narrower area.

10. The map display manipulation apparatus according to claim 6, wherein:
the z axis is along a direction orthogonal to the map display in the display portion; and
as the manipulator is displaced to move along the z axis closer to the map display, a reduced scale of the map decreases to thereby reduce the map and cover a wider area whereas as the manipulator is displaced to move along the z axis farther away from the map display, the reduced scale of the map increases to thereby enlarge the map and cover a narrower area.

11. The map display manipulation apparatus according to claim 6, wherein:
the map information stores specific spots that are assigned with respective weighting factors;
the control circuit calculates a weighted center from specific spots that are contained in the map display;
when the reduced scale is increased, the weighted center is shifted to approach a map-center position centered in the display portion.

12. The map display manipulation apparatus according to claim 11, wherein:
the control circuit calculates the weighted center such that moment values of the specific spots in the map display are balanced at the weighted center; and
the moment value of a subject specific spot of the specific spots is a product obtained by multiplying the weighting factor of the subject specific spot and a distance between a coordinate set of the subject specific spot and the weighted center.

13. The map display manipulation apparatus according to claim 12, wherein:
when the reduced scale is increased to a predetermined maximum reduced scale, the weighted center is shifted to the map-center position in the display portion.

14. The map display manipulation apparatus according to claim 12, wherein:
in cases that the subject specific spot is designated as a destination n times the control circuit performs an adjustment to adjust the weighting factor of a subject specific spot such that
the weighting factor adjusted is increased as the n increases whereas
the weighting factor adjusted is decreased as an elapsed time increases since the subject specific spot is designated the n times.

15. The map display manipulation apparatus according to claim 14, wherein:
the control circuit performs the adjustment to obtain an adjusted weighting value according to an equation of $W = W0 \times \log(C/T) + W0$,
wherein W is an adjusted weighting value, W0 is a predetermined weighting factor, C is a number of times of destination designations, T is an elapsed time since a most recent destination designation.

16. The map display manipulation apparatus according to claim 6, wherein:
when the control circuit determines whether the one-time displacement corresponds to the z-oblique displacement, a tolerance value is provided with respect to each of the one-time x displacement, the one-time y displacement, and the one-time z displacement for determining.

17. The map display manipulation apparatus according to claim 16, wherein:
the tolerance value is determined based on a variance of a plurality of one-time displacements at a plurality of detecting times.

18. The map display manipulation apparatus according to claim 6, wherein:
the manipulator includes a remote control; and
the position detector includes an acceleration sensor provided in the remote control.

19. The map display manipulation apparatus according to claim 6, wherein:
when it is determined that the one-time displacement does not correspond to the z-oblique displacement and the one-time displacement corresponds to a z-orthogonal displacement being orthogonal to the z axis in the subsequent operation,
the control circuit
(i) assigning newly the reference lowest z coordinate with a value of the subsequent z coordinate,
(ii) moving the map, which was in a displayed state in the display portion after a subsequent operation at the previous detecting time, laterally by a third product and longitudinally by a fourth product, to thereby contain a second new map-center position centered in the display portion,
the third product being obtained by multiplying the one-time x displacement by a third unit distance according to the subsequent reduced scale based on the subsequent z coordinate,
the fourth product being obtained by multiplying the subsequent-time x displacement by a fourth unit distance according to the subsequent reduced scale based on the subsequent z coordinate,
(iii) assigning newly the reference map-center position with a value of the second new map-center position, and
(iv) assigning newly the reference coordinate set with a value of the subsequent coordinate set; and
when it is determined that the one-time displacement does not correspond to the z-oblique displacement and the one-time displacement corresponds to a z-parallel displacement being parallel with the z axis in the subsequent operation,
the control circuit
(i) assigning newly the reference lowest z coordinate with a value of the subsequent z coordinate,
(ii) changing the reduced scale of the map, which was in a displayed state to contain a third new map-center position centered in the display portion after a subsequent operation at the previous detecting time, to a subsequent reduced scale based on the subsequent z coordinate,
(iii) assigning newly the reference map-center position with a value of the third new map-center position, and
(iv) assigning newly the reference coordinate set with a value of the subsequent coordinate set.

20. A method for displaying a map by a control circuit cooperating with a display portion, a manipulator, and a position detector,
the display portion performing a map display to display a map based on map information,
the manipulator performing a manipulation to the map display, the manipulator being displaced in a three-dimensional coordinate system of x axis, y axis, and z axis, the x, y, and z axes being mutually orthogonal,
the manipulator displaced parallel with the x axis and the y axis permitting the map to move laterally and longitudinally, respectively,
the manipulator displaced parallel with the z axis permitting a reduced scale of the map to change such that as a z coordinate becomes lower, the reduced scale decreases to permit a displayed map in the display portion to cover a wider area;

the position detector detecting and outputting a coordinate set as a position of the manipulator in the three-dimensional coordinate system at each of successive detecting times from an initial detecting time to subsequent detecting times, the control circuit controlling the map display in the display portion on a basis of a real time in response to receiving the coordinate set of the manipulator at each of the successive detecting times, the method comprising:

performing an initial operation when receiving an initial coordinate set at the initial detecting time from the position detector, the initial operation
   (i) assigning a reference coordinate set of the manipulator with a value of the initial coordinate set,
   (ii) assigning a reference lowest z coordinate with a value of the initial z coordinate,
   (iii) displaying the map under an initial reduced scale with an initial map-center position centered in the display portion, and
   (iv) assigning a reference map-center position with a value of the initial map-center position; and performing a subsequent operation when receiving a subsequent coordinate set at a subsequent detecting time after the initial detecting time from the position detector, the subsequent operation
   (i) calculating a one-time displacement between the subsequent coordinate set and a previous coordinate set, which is outputted from the position detector at a previous detecting time that is just previous to the subsequent detecting time, the one-time displacement having a one-time x displacement, a one-time y displacement, and a one-time z displacement,
   (ii) calculating a cumulative displacement between the subsequent coordinate set and a present value of the reference coordinate set, the cumulative displacement having a cumulative x displacement, a cumulative y displacement, and a cumulative z displacement, and
   (iii) determining whether the one-time displacement corresponds to a z-oblique displacement, z-orthogonal displacement, or a z-parallel displacement,
      the z-oblique displacement being neither parallel with the z axis nor orthogonal to the z axis,
      the z-orthogonal displacement being orthogonal to the z axis,
      the z-parallel displacement being parallel with the z axis, the subsequent operation then further,
   when it is determined that the one-time displacement corresponds to the z-oblique displacement,
   (i) comparing a present value of the reference lowest z coordinate with a subsequent value of the subsequent z coordinate and assigning the reference lowest z coordinate with a lower value of the present value and the subsequent value,
   (ii) displaying the map under a subsequent reduced scale based on the subsequent z coordinate with a first new map-center position centered in the display portion, the first new map-center position being away from the reference map-center position laterally by a first product and longitudinally by a second product,
      the first product being obtained by multiplying the cumulative x displacement by a first unit distance according to a lowest reduced scale based on the reference lowest z coordinate,
      the second product being obtained by multiplying the cumulative y displacement by a second unit distance according to the lowest reduced scale based on the reference lowest z coordinate,
   (iii) maintaining unchanged a present value of the reference map-center position, and
   (iv) maintaining unchanged a present value of the reference coordinate set.

* * * * *